US012691872B2

(12) United States Patent (10) Patent No.: US 12,691,872 B2
Shin et al. (45) Date of Patent: Jul. 28, 2026

(54) SYSTEM AND METHOD FOR GENERATING EMERGENCY COLLISION AVOIDANCE STRATEGY FOR A VEHICLE

(71) Applicants: HYUNDAI MOTOR COMPANY, Seoul (KR); KIA CORPORATION, Seoul (KR); AJOU UNIVERSITY INDUSTRY-ACADEMIC COOPERATION FOUNDATION, Suwon-si (KR)

(72) Inventors: Jang-Ho Shin, Hwaseong-si (KR); Ji-Min Lee, Suwon-si (KR); Bong-Sob Song, Suwon-si (KR); Sung-Woo Lee, Suwon-si (KR)

(73) Assignees: HYUNDAI MOTOR COMPANY, Seoul (KR); KIA CORPORATION, Seoul (KR); AJOU UNIVERSITY INDUSTRY—ACADEMIC COOPERATION FOUNDATION, Suwon-si (KR)

( * ) Notice: Subject to any disclaimer, the term of this patent is extended or adjusted under 35 U.S.C. 154(b) by 69 days.

(21) Appl. No.: 18/768,873

(22) Filed: Jul. 10, 2024

(65) Prior Publication Data

US 2025/0289422 A1 Sep. 18, 2025

(30) Foreign Application Priority Data

Mar. 12, 2024 (KR) ........................ 10-2024-0034401

(51) Int. Cl.
*B60W 30/09* (2012.01)
*B60W 30/095* (2012.01)

(52) U.S. Cl.
CPC ..... *B60W 30/0953* (2013.01); *B60W 2520/10* (2013.01); *B60W 2520/12* (2013.01)

(58) Field of Classification Search
CPC ......... B60W 30/0953; B60W 2520/10; B60W 2520/12; B60W 30/09; B60W 30/0956;
(Continued)

(56) References Cited

U.S. PATENT DOCUMENTS

2016/0071418 A1* 3/2016 Oshida ................ B60W 30/165
701/23
2017/0090480 A1* 3/2017 Ho ........................ B60W 30/00
(Continued)

FOREIGN PATENT DOCUMENTS

KR 20200068772 A 6/2020

*Primary Examiner* — Daniel M. Robert
(74) *Attorney, Agent, or Firm* — Lumpia Summerfield Katz LLC

(57) ABSTRACT

A system for establishing a strategy for allowing a vehicle to avoid collision risk. The system includes a risk degree determination unit configured to determine a degree of collision risk with a nearby object of an ego vehicle; a vehicle trajectory prediction unit configured to predict a future vehicle trajectory of the nearby object; an avoidance trajectory prediction unit configured to predict a future avoidance trajectory of the ego vehicle corresponding to a plurality of avoidance strategies for avoiding collision with the nearby object; and a collision avoidance strategy determination unit configured to learn the future vehicle trajectory of the nearby object and the future avoidance trajectory of the ego vehicle and output an avoidance strategy selected from the plurality of avoidance strategies.

19 Claims, 28 Drawing Sheets

(58) Field of Classification Search
CPC .............. B60W 30/095; B60W 40/02; B60W
50/0097; B60W 60/0027; B60W 2552/53;
G06N 3/08
See application file for complete search history.

(56) References Cited

U.S. PATENT DOCUMENTS

| | | | |
|---|---|---|---|
| 2019/0146496 A1* | 5/2019 | Woodrow ........... | G05D 1/0088 |
| | | | 701/25 |
| 2020/0166951 A1 | 5/2020 | Choi | |
| 2021/0004611 A1* | 1/2021 | Garimella .............. | G08G 1/166 |
| 2021/0046924 A1* | 2/2021 | Caldwell ............... | B60W 30/09 |
| 2021/0064890 A1* | 3/2021 | Murveit .............. | G05D 1/0212 |
| 2022/0063667 A1* | 3/2022 | Wolff .................... | B60W 30/12 |
| 2023/0166764 A1* | 6/2023 | Johnson ................. | G06F 30/15 |
| | | | 701/23 |
| 2023/0373476 A1* | 11/2023 | Ho ........................ | B60W 50/14 |
| 2024/0001966 A1* | 1/2024 | Jiang ..................... | G06V 10/82 |
| 2024/0270238 A1* | 8/2024 | Min .................. | B60W 30/0956 |
| 2024/0367646 A1* | 11/2024 | Maulimov ........ | B60W 30/0956 |
| 2025/0083704 A1* | 3/2025 | Ng .................... | B60W 60/0011 |

* cited by examiner

SYSTEM AND METHOD FOR GENERATING EMERGENCY COLLISION AVOIDANCE STRATEGY FOR A VEHICLE

CROSS-REFERENCE TO RELATED APPLICATION

This application claims benefit of and priority to Korean Patent Application No. 10-2024-0034401, filed on Mar. 12, 2024, which is incorporated herein by reference in its entirety.

FIELD OF THE DISCLOSURE

The present disclosure relates to a system and a method for controlling a vehicle by establishing a strategy capable of avoiding an emergency collision in risky situations of a vehicle during traveling.

BACKGROUND

As a technology of improving vehicle safety during traveling, there are technologies, such as forward collision warning (FCW), emergency braking, and automatic emergency steering (AES). However, a minimal risk maneuver (MRM) or collision avoidance technology based on a data-based or deep learning-based approach has not been commercialized.

In other words, when a failure occurs during autonomous driving, a minimum risk state (MRC) defined in SAE J3016 and ISO NP 23793-1, i.e., an MRM for reaching a standstill state is defined. However, no method for following an avoidance strategy for allowing a vehicle to continuously travel safely by avoiding risky situations has been suggested.

Matters described above in the background art are intended to help understanding of the background of the disclosure and may include matters not related to the related art already known to those having ordinary skill in the art to which this technology pertains.

SUMMARY OF THE DISCLOSURE

The present disclosure has been made in efforts to solve the problems and is directed to providing a system and a method of establishing an emergency collision avoidance strategy for following an avoidance strategy for allowing a vehicle to continuously travel safely by avoiding the corresponding risky situation in addition to a strategy for minimizing risk upon perceiving risky situations while a vehicle travels.

A system for establishing a strategy for allowing a vehicle to avoid collision risk according to one aspect of the present disclosure includes a risk degree determination unit configured to determine a degree of collision risk with a nearby object of an ego vehicle. The system includes a vehicle trajectory prediction unit configured to predict a future vehicle trajectory of the nearby object. The system includes an avoidance trajectory prediction unit configured to predict a future avoidance trajectory of the ego vehicle corresponding to a plurality of avoidance strategies for avoiding collision with the nearby object. The system includes a collision avoidance strategy determination unit configured to learn the future vehicle trajectory of the nearby object and the future avoidance trajectory of the ego vehicle and output an avoidance strategy selected from the plurality of avoidance strategies.

In addition, the system may further include a bird's eye view generation unit configured to generate a bird's eye view image reflecting the degree of collision risk and the vehicle trajectory of the nearby object, and a result of predicting the future avoidance trajectory of the ego vehicle.

Furthermore, the collision avoidance strategy determination unit may learn a stacked bird's eye view of a plurality of bird's eye view images reflecting a plurality of avoidance trajectory prediction results. The collision avoidance strategy determination unit may output an avoidance strategy selected from the avoidance strategies through a convolutional neural network (CNN) technique.

Meanwhile, the system may further include a nearby object information detection unit configured to acquire state information including a location, a speed, and an acceleration of the nearby object through a sensor mounted on the vehicle. The system may further include a lane information detection unit configured to acquire lanes near the ego vehicle and shoulder information through the sensor mounted on the vehicle or a precision map.

In addition, the risk degree determination unit may calculate a longitudinal collision risk index, a time to lane crossing (TLC), and a lateral collision risk index using the state information and lane and shoulder information and may determine the degree of collision risk.

In addition, the vehicle trajectory prediction unit may predict the future vehicle trajectory of the nearby object through an estimation algorithm or a deep-learning algorithm using the state information and the lane and shoulder information.

More specifically, the bird's eye view generation unit may generate the bird's eye view reflecting a past traveling trajectory, a current location, a future vehicle trajectory, and a final location of the nearby object, a current location and an avoidance trajectory prediction result of the ego vehicle, and lane and shoulder information near the ego vehicle.

In addition, the bird's eye view generation unit may generate the bird's eye view image to be displayed separately according to the degree of collision risk.

Meanwhile, the plurality of avoidance strategies may include a lane change to left (LCL), a lane change to right (LCR), a steering to shoulder stop (SSS), an evasive steering to left (ESL), and an evasive steering to right (ESR).

Therefore, the collision avoidance strategy determination unit may output an avoidance strategy with a set high priority when it is determined that multiple avoidance strategies among the plurality of avoidance strategies are possible as a result of learning.

In addition, the collision avoidance strategy determination unit may output a result value corresponding to safety when it is predicted that no collision with the nearby object occurs as a result of learning without considering the future avoidance trajectory of the ego vehicle.

In addition, the collision avoidance strategy determination unit may output a result value corresponding to collision when it is predicted that it is impossible to avoid collision with the nearby object as a result of learning the plurality of avoidance strategies.

Next, a method of establishing a strategy for allowing a vehicle to avoid collision risk according to one aspect of the present disclosure includes acquiring state information including a location, a speed, and an acceleration of a nearby object and lane and shoulder information near an ego vehicle. The method includes determining a degree of collision risk with the nearby object of the ego vehicle by using the state information and the lane and shoulder information. The method includes predicting a future vehicle trajectory of the nearby object by using the state information and the lane and shoulder information. The method includes predicting a future avoidance trajectory of the ego vehicle corresponding to a plurality of avoidance strategies for avoiding collision with the nearby object. The method includes learning the future vehicle trajectory of the nearby object and the future avoidance trajectory of the ego vehicle. The method includes outputting an avoidance strategy selected from the plurality of avoidance strategies.

In addition, the method may further include generating a bird's eye view image reflecting results of determining the degree of collision risk, predicting the future vehicle trajectory of the nearby object, and predicting the future avoidance trajectory of the ego vehicle are reflected. Outputting the avoidance strategy may include learning a stacked bird's eye view of a plurality of bird's eye view images reflecting a plurality of avoidance trajectory prediction results and may include outputting an avoidance strategy selected from the avoidance strategies through a convolutional neural network (CNN) technique.

In addition, generating the bird's eye view image may include generating the bird's eye view image reflecting a past traveling trajectory, a current location, a future vehicle trajectory, and a final location of the nearby object, a current location and an avoidance trajectory prediction result of the ego vehicle, and the lane and shoulder information near the ego vehicle. Generating the bird's eye view image may include separately displaying the bird's eye view image according to the degree of collision risk.

Meanwhile, the plurality of avoidance strategies may include a lane change to left (LCL), a lane change to right (LCR), a steering to shoulder stop (SSS), an evasive steering to left (ESL), and an evasive steering to right (ESR).

More specifically, outputting the avoidance strategy may include determining whether the nearby object is present at a left side of the ego vehicle. Outputting the avoidance strategy may include determining whether a shoulder is present near the ego vehicle when the nearby object is present at the left side of the ego vehicle. Outputting the avoidance strategy may include determining whether collision occurs when an SSS strategy is applied when the shoulder is present. Outputting the avoidance strategy may include outputting the SSS strategy when the collision does not occur when the SSS strategy is applied. Outputting the avoidance strategy may include outputting a result value corresponding to the collision when the collision occurs.

In addition, the method may further include determining whether the collision occurs when an ESR strategy is applied when no shoulder is present by the determining of whether the shoulder is present. The method may further include outputting the ESR strategy when no collision occurs when the ESR strategy is applied. The method may further include determining whether the collision occurs when an LCR strategy is applied when the collision occurs when the ESR strategy is applied. The method may further include outputting the LCR strategy when no collision occurs when the LCR strategy is applied. The method may further include outputting a result value corresponding to the collision when the collision occurs.

In addition, the method may further include determining whether the collision occurs when an ESL strategy is applied when no nearby object is present at the left side of the ego vehicle by the determining of whether the nearby object is present at the left side of the ego vehicle. The method may further include outputting the ESL strategy when no collision occurs when the ESL strategy is applied. The method may further include determining whether the collision occurs when an LCL strategy is applied when the collision occurs when the ESL strategy is applied. The method may further include outputting the LCL strategy when no collision occurs when the LCL strategy is applied. The method may further include outputting a result value corresponding to the collision when the collision occurs.

In addition, outputting the avoidance strategy may include outputting a result value corresponding to safety when it is predicted that no collision with the nearby object occurs as a result of learning without considering the avoidance trajectory of the ego vehicle.

The present disclosure proposes a method and parallel structure for adopting a deep learning-based algorithm to improve risk determination performance of an active safety system for improving a driver's safety.

In other words, to apply a data-based deep learning algorithm to the active safety system, it is expected that the reliability of the application of the new algorithm can be improved by actively using the risk determination algorithm that has been previously used, that is, has been verified in numerous road tests.

Through such a method, it is possible to determine the time point at which the control authority is transferred from the autonomous driving system to the integrated safety system in the risky situations in which the collision is expected, establish a more sophisticated collision avoidance strategy before an actual collision time point, and minimize the degree of risk even when the collision occurs through the cooperative control with the collision avoidance system.

DESCRIPTION OF SPECIFIC EMBODIMENTS

For a full understanding of the present disclosure, operational advantages of the present disclosure, and objects to be achieved by practicing the present disclosure, reference should be made to the accompanying drawings, which illustrate embodiments of the present disclosure, and contents described in the accompanying drawings. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, unit, component, device, element, and the like may separately embody or be included with a processor and a memory, such as a non-transitory computer readable media, as part of the apparatus.

In describing the embodiments of the present disclosure, a description of known techniques or repetitive descriptions that may unnecessarily obscure the gist of the present disclosure has been reduced or omitted.

Figure 1:
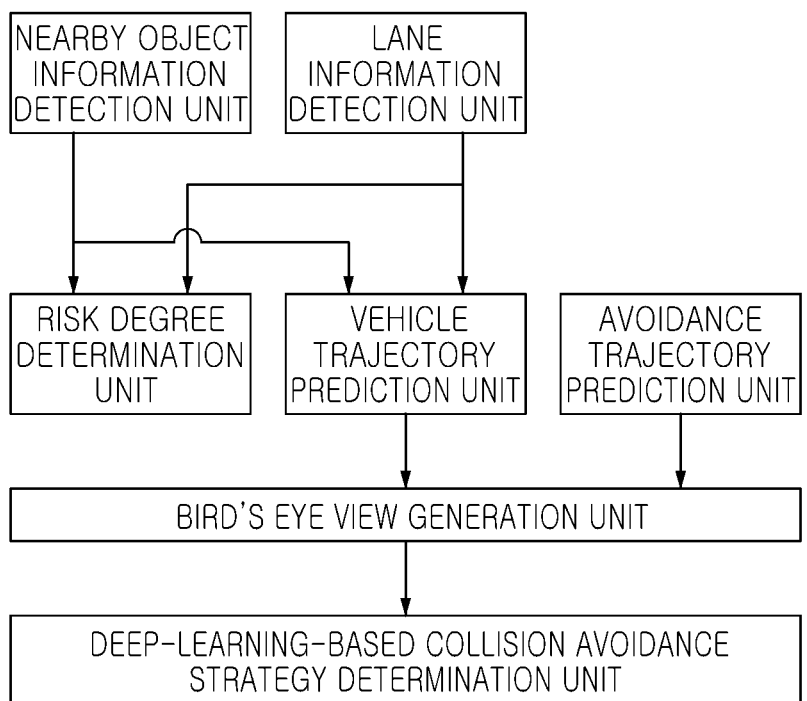
FIG. 1 is a block diagram of a system for establishing an emergency collision avoidance strategy according to the present disclosure.

FIG. 1 is a block diagram of a system for establishing an emergency collision avoidance strategy according to the present disclosure.

Hereinafter, a system for establishing an emergency collision avoidance strategy of a vehicle according to one embodiment of the present disclosure is described with reference to FIG. 1.

The present disclosure provides a system for establishing a strategy capable of avoiding an emergency collision according to the degree of risk by nearby vehicles while a vehicle travels and uses the same to control the vehicle as safely as possible.

To this end, the system for establishing the emergency collision avoidance strategy according to the present disclosure includes a nearby object information detection unit, a lane information detection unit, a risk degree determination unit, a vehicle trajectory prediction unit, an avoidance trajectory prediction unit, a bird's eye view generation unit, and a collision avoidance strategy determination unit.

The nearby object information detection unit serves to acquire state information (e.g., a location, a speed, acceleration, and a heading angle) of detected nearby objects by fusing multiple sensors, such as cameras and radars. The lane information detection unit may include lane and shoulder detection, may acquire lane information (e.g., a distance to a lane, a road slope, and a curvature) based on a camera sensor, and may provide information about the presence or absence and width of the shoulder using a precision map.

The precision map is an autonomous driving map and may include information about lanes, traffic lights, signs, and the like to accurately measure vehicle's locations and enhance the safety of autonomous driving.

The risk degree determination unit is an algorithm for calculating the degree of risk of collision with an ego vehicle through the state information of nearby objects that is received from the nearby object information detection unit. The vehicle trajectory prediction unit predicts state information, such as locations and speeds of the nearby objects, using an estimation algorithm (e.g., a Kalman filter) or a deep learning algorithm (e.g., a long short-term memory model (LSTM)).

The bird's eye view generation unit generates a bird's eye view image by integrating not only lane and shoulder information and nearby object information but also risk degree determination and vehicle trajectory prediction results.

The deep learning-based collision avoidance strategy determination unit first predicts an avoidance trajectory by reflecting an avoidance strategy of an ego vehicle, based on the same, generates and stacks several predicted images, and generates the predicted images as inputs for classification of the collision avoidance strategy. Next, there is a method of classifying the collision avoidance strategy based on a convolutional neural network (CNN) that is one of deep learning techniques.

A method of determining the degree of risk by the risk degree determination unit is specifically described. The risk degree determination unit may be a conventional black box-type algorithm, and in the present disclosure, the risk degree determination unit below is used to check practical effectiveness.

Next, a longitudinal collision risk index $I_{long}$ is calculated by using Equation 1. Hereinafter, an x-axis indicates a vertical direction, and a y-axis indicates a horizontal direction.

$$I_{long} = \max\left(\frac{|x_{max} - x_p|}{|x_{max} - x_{th}|}, \frac{|TTC^{-1}|}{|TTC_{th}^{-1}|}\right) \qquad \text{[Equation 1]}$$

Here, a warning index $x_p$ may be calculated through a relative distance between the ego vehicle and the preceding vehicle and a warning distance $d_w$ and a braking distance $d_{br}$ that are calculated at a current time point, and the equation is as follows.

$$x_p = \frac{d - d_{br}}{d_w - d_{br}} \qquad \text{[Equation 2]}$$

$$d_w = v_x t_{sys} + d_{br}$$

$$d_{br} = v_x t_{br} - \frac{v_{ego}^2 - v_{tar}^2}{2a_{max}}$$

Here, $v_x$, $v_{ego}$, and $v_{tar}$ denote a longitudinal relative speed, a longitudinal speed of the ego vehicle, and a longitudinal speed of another vehicle, respectively, and $t_{sys}$ and $t_{br}$ denote delay times of the system and required for the braking, respectively. In addition, $a_{max}$ denotes a maximum longitudinal deceleration of the ego vehicle.

Here, TTC indicates a time to collision, and $TTC_{th}^{-1}$ denotes a threshold value of $TTC^{-1}$ and may be, for example, 0.5.

In addition, $x_{max}$ denotes a maximum value of the warning index, $x_{th}$ denotes a threshold value of the warning index, and $TTC_{th}^{-1}$ denotes the threshold value of $TTC^{-1}$.

Subsequently, a time to lane crossing (TLC) is calculated by using Equation 3. Y denotes a lateral relative location of a nearby vehicle, and $v_y$ denotes a lateral relative speed.

$$TLC = \frac{y}{v_y} \qquad \text{[Equation 3]}$$

In addition, a lateral collision risk index $I_{lat}$ is calculated by using Equation 4.

$$I_{lat} = \min(I_{long}, 1) \cdot \min\left(\frac{TLC_{th}}{TLC}, 1\right) \qquad \text{[Equation 4]}$$

The lateral collision risk index has a value between 0 and 1, and when the lateral collision risk index is closer to 1, it means that a current situation is risky, and $TLC_{th}$ may be, for example, 0.5.

Next, the method of predicting the vehicle trajectory by the vehicle trajectory prediction unit is specifically described. Prediction is to predict the location of the nearby vehicle using an interaction multiple model (IMM) based on an unscented Kalman filter (UKF) (Rafael Toledo-Moreo, Miguel A and Zamora-Izquierdo, "IMM-based lane-change prediction in highways with low-cost GPS/INS," IEEE transaction on intelligent transportation systems, Vol 10, No. 1, 2009).

Figure 2:
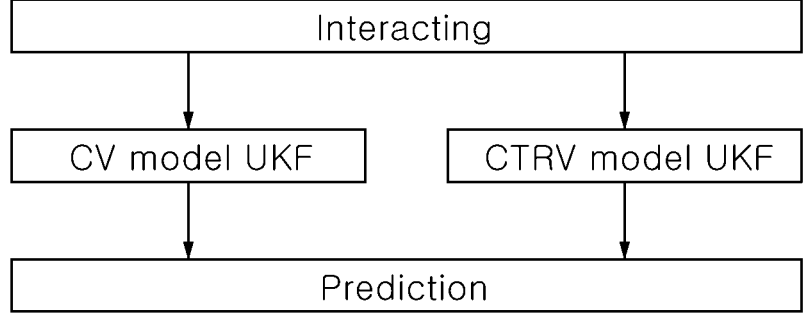
FIG. 2 is a block diagram of a vehicle trajectory prediction unit according to the present disclosure.

In FIG. 2, the vehicle trajectory prediction unit receives information about nearby vehicles measured by each of the multiple sensors (e.g., a camera, a radar, and light detection and ranging (LiDAR)), calculates a model probability in an interacting unit, and transitions a mode based on a Markovian process. In addition, the unscented Kalman filter (UKF) calculates state values of the nearby vehicles based on two models. The two models are calculated based on a constant velocity (CV) model for predicting straight driving and a constant turn rate and velocity (CTRV) model for predicting a lane change.

Lastly, the prediction unit predicts the locations of the nearby vehicles through a combination of values calculated from each model. In this case, a prediction horizon may be 2 seconds.

Figure 3:
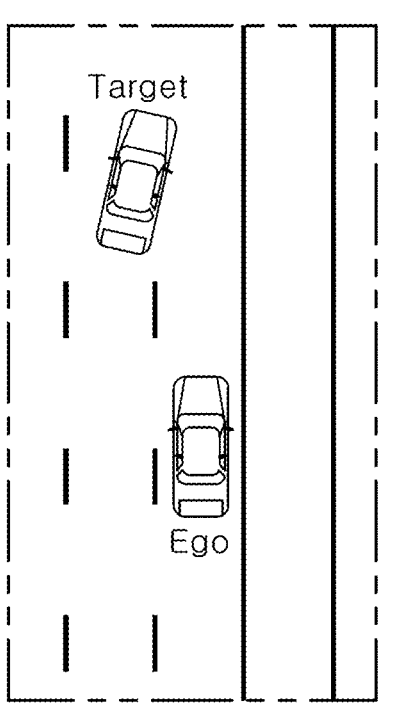
FIG. 3 is an example of a bird's eye view in which predicted trajectory values of nearby vehicles are reflected.
Figure 3:
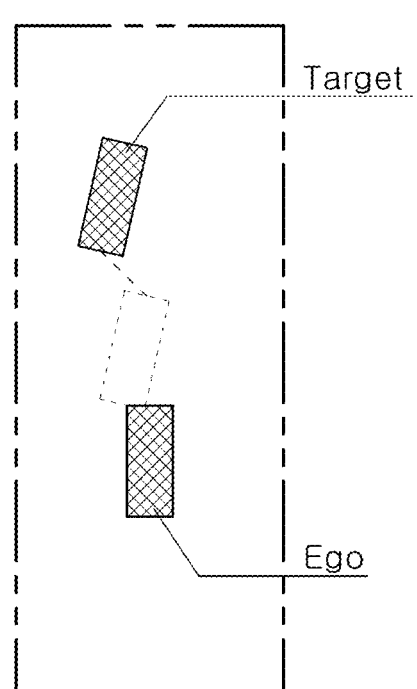

FIG. 3 shows a bird's eye view result in which predicted trajectory values of the nearby vehicle are reflected. FIG. 3 shows current locations of an ego vehicle (Ego) and a nearby vehicle (Target). In this case, dotted line and dotted line rectangle indicate a predicted location (0.2 to 1.8 s) and a final value of the predicted location (2 s) of nearby vehicle, respectively.

Next, the bird's eye view generation unit is described specifically.

Figure 4:
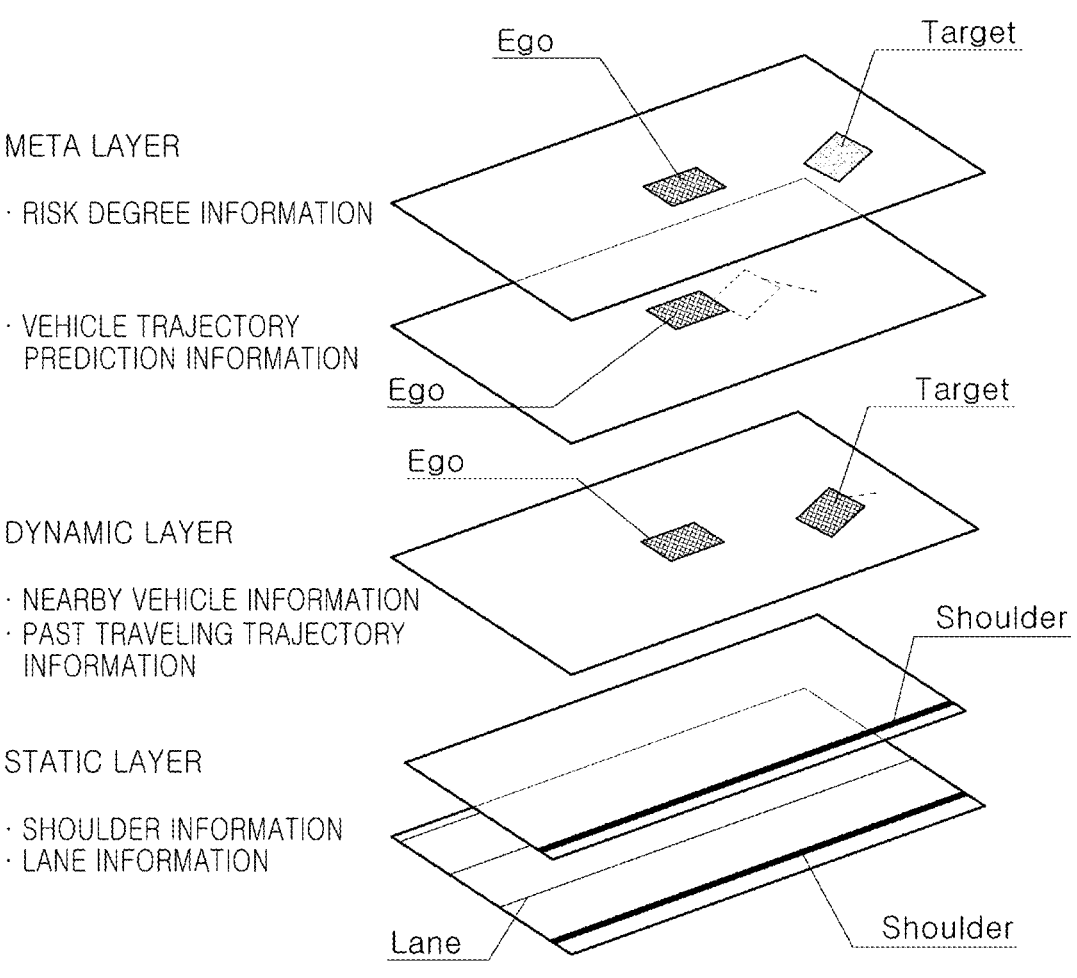
FIG. 4 shows a hierarchy that constitutes a red, green and blue (RGB) bird's eye view image for the situation of FIG. 3.
Figure 5:
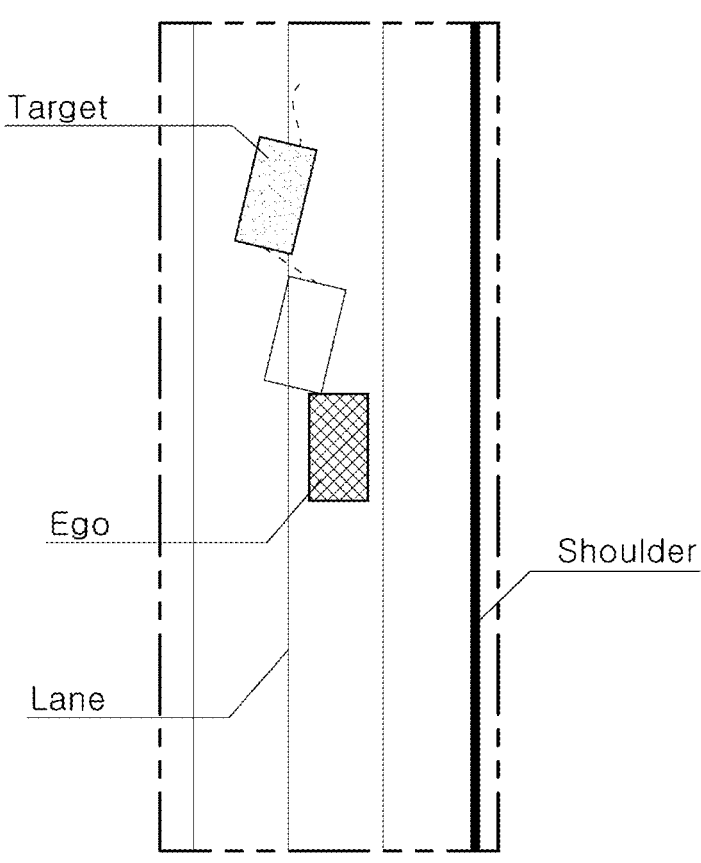
FIG. 5 is an example of a final bird's eye view combining images for each layer of FIG. 4.

FIG. 4 shows the hierarchy that constitutes a red, green and blue (RGB) bird's eye view image for the situation of FIG. 3. The bird's eye view image is largely composed of static, dynamic, and meta layers, and by combining the layers, one bird's eye view image as shown in FIG. 5 is generated.

First, the size of the bird's eye view is defined according to measurement ranges of sensors mounted on the ego vehicle. In general, it is desirable to include a length of about 25 to 50 (m) in the vertical direction and about 3 lanes in the horizontal direction.

In the static layer, lane information (e.g., a lane width and a curvature) and shoulder information (e.g., the presence or absence of a shoulder and a shoulder width) are represented separately to reflect a road shape. In the drawing, the lane is identified by a line width, and in RGB, the lane may be marked by a green solid line and a black solid line. If necessary, the lane may include dotted lines, curved lines, or the like.

In the dynamic layer, the locations of the ego vehicle (Ego) and the nearby vehicle (Target) may be marked by black squares or the like, and additionally, the past traveling trajectory of the nearby vehicle may be marked by a black dotted line. Although the ego vehicle and the nearby vehicle are marked differently in the drawing, the ego vehicle and the nearby vehicle may be marked in the same color in RGB.

Lastly, the meta layer includes risk information of the risk degree determination unit and information of the vehicle trajectory prediction unit. The degree of risk may be classified by the brightness of a red channel.

In addition, as shown in FIG. 3, the predicted location of the nearby vehicle is marked by the dotted line in the bird's eye view. In addition, the last sample of the time-window is marked by a dotted line rectangle.

By combining the images for each layer in FIG. 4, the bird's eye view image is finally generated as shown in FIG. 5.

The shapes, lines, and colors used in FIG. 5 may be changed. For example, various objects, such as cars, trucks, and pedestrians, may be simplified by using quadrangles or circles with different sizes. In addition, the definition of hatching expression in the drawing or colors in RGB may be changed, unlike the description in the example.

Next, a method of predicting the avoidance trajectory of the ego vehicle by the avoidance trajectory prediction unit is described specifically.

Figure 6:
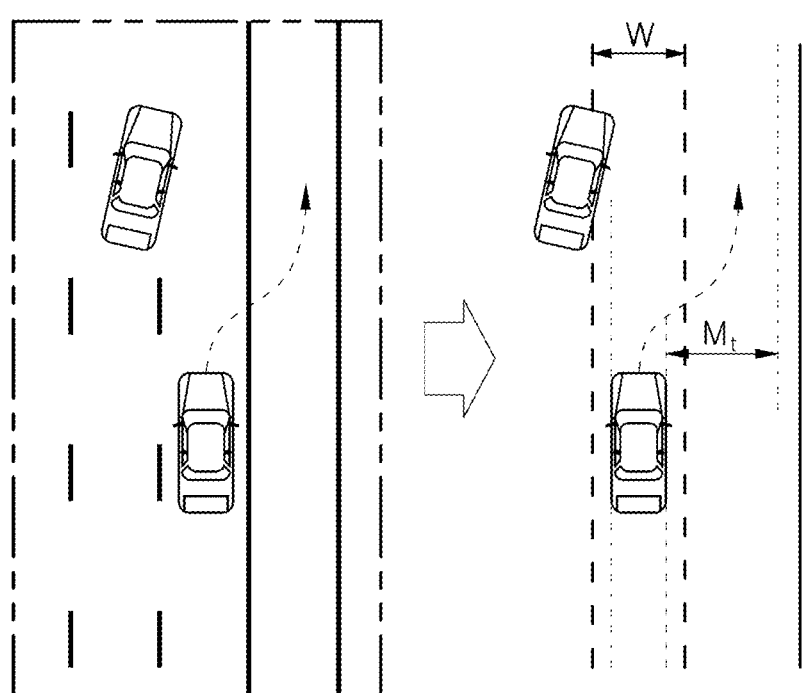
FIG. 6 is an example of an avoidance trajectory by an avoidance trajectory prediction unit according to the present disclosure.

FIG. 6 shows a situation in which another vehicle attempts to change a lane on a straight road, and an avoidance strategy of the ego vehicle is SSS.

As described below, the avoidance strategy includes lane change (LC) (left/right), steering to shoulder stop (SSS), and evasive steering (ES) (left/right), and FIG. 6 shows the trajectory prediction upon the SSS strategy among them.

An equation of the trajectory generation algorithm for lane avoidance is as represented by Equation 5 (J. Suh, et al, "Stochastic model-predictive control for lane change decision of automated driving vehicles," IEEE Trans. on vehicular technology, 2018).

$$y_{des}(t) = C_1\tanh(C_2 t + C_3) = e_{y,0} \qquad \text{[Equation 5]}$$

$$C_1 = \frac{M_t - e_{y,0}}{2}, \quad C_2 = \sqrt{\frac{a_{y,lim}}{a_{y,0} \cdot C_1}}$$

$$C_3 = \frac{t_{LC}}{2}C_2, \quad t_{LC} = \frac{2}{C_2}\tanh^{-1}\left(\frac{M_t - C_1 - e_{y,0}}{C_1}\right)$$

Here, $e_{y,0}$ denotes a current lateral location of the ego vehicle, and $a_{y,lim}$ and $a_{y,0}$ denote parameters indicating a maximum lateral acceleration and a current acceleration, respectively. $t_{LC}$ denotes a time during which avoidance proceeds, and $C_1$, $C_2$, and $C_3$ denote coefficients. In addition, $M_t$ denotes a maximum distance that the ego vehicle may move laterally, which is determined according to the determination strategy.

Figure 7:
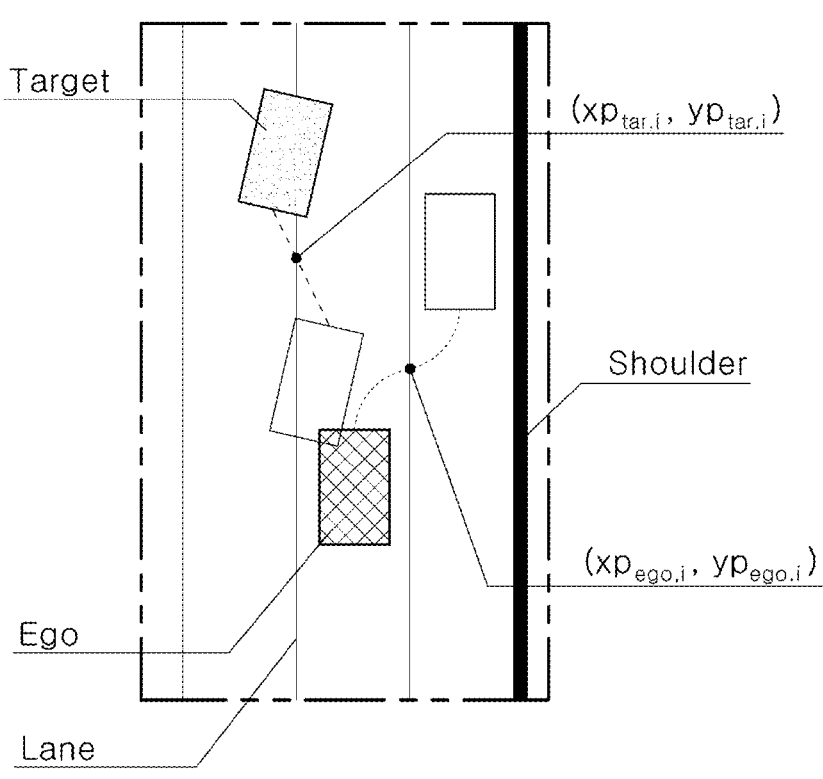
FIG. 7 shows a predicted trajectory of an ego vehicle and a predicted trajectory of another vehicle according to a lane change strategy shown in FIG. 6.

FIG. 7 shows each of the predicted trajectory of the ego vehicle and the predicted trajectory of another vehicle, which is output information of the vehicle trajectory prediction unit, with respect to the lane change strategy described in FIG. 6.

Figure 8:
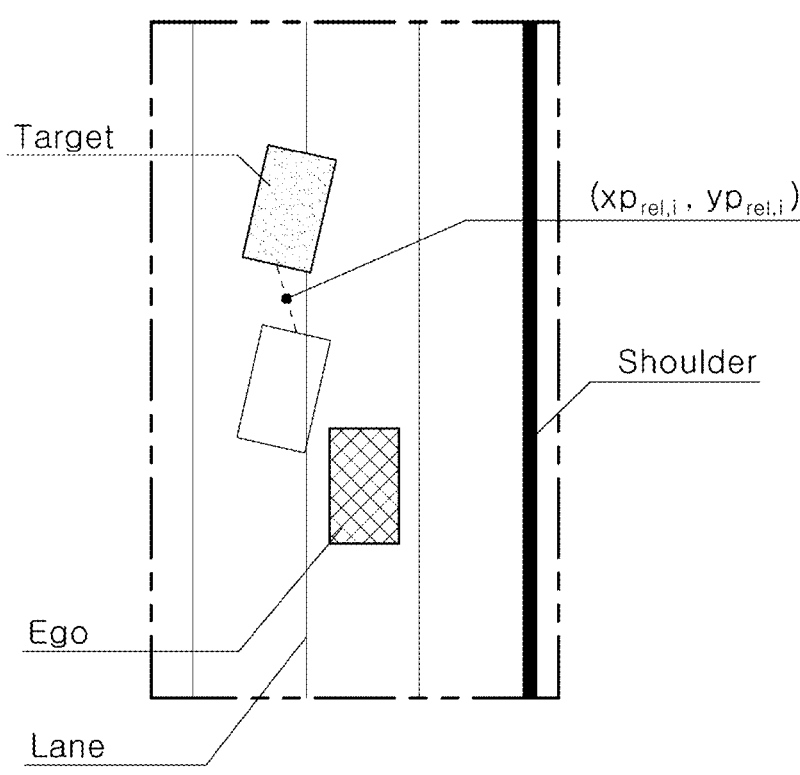
FIG. 8 shows predicted trajectories of FIG. 7 that are converted into a relative distance to the ego vehicle.

Lastly, FIG. 8 shows a case of being converted into the relative distance to the ego vehicle using Equation 6. As in FIG. 6, when the ego vehicle moves, a collision does not occur, and it can be visually confirmed that a collision neither occur in FIG. 8.

$$xp_{rel,i} = xp_{tar,i} - xp_{ego,i} \qquad \text{[Equation 6]}$$

-continued $$yp_{rel,i} = yp_{tar,i} - yp_{ego,i}$$

where i=1, . . . , 10 represents the prediction time horizon.

Next, FIGS. 9-14 show a bird's eye view of the avoidance trajectory by the avoidance strategy of the collision avoidance strategy determination unit according to the present disclosure.

The avoidance strategy selected by the collision avoidance strategy determination unit includes lane change (LC) (left/right), steering to shoulder stop (SSS), and evasive steering(ES) (left/right) and includes a total of 5 avoidance strategies. The avoidance strategy may be further defined and the corresponding avoidance trajectories may be added.

Figure 9:
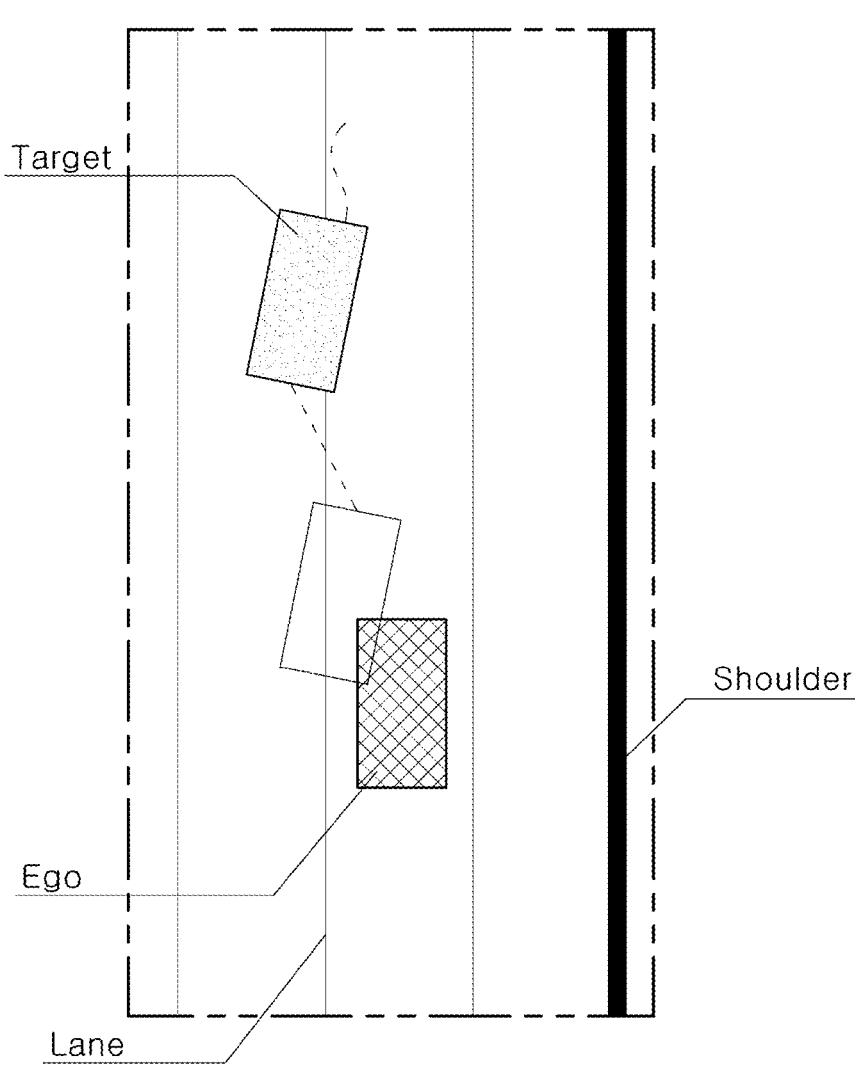
FIGS. 9-14 show avoidance trajectories based on an avoidance strategy of a collision avoidance strategy determination unit according to the present disclosure.
Figure 10:
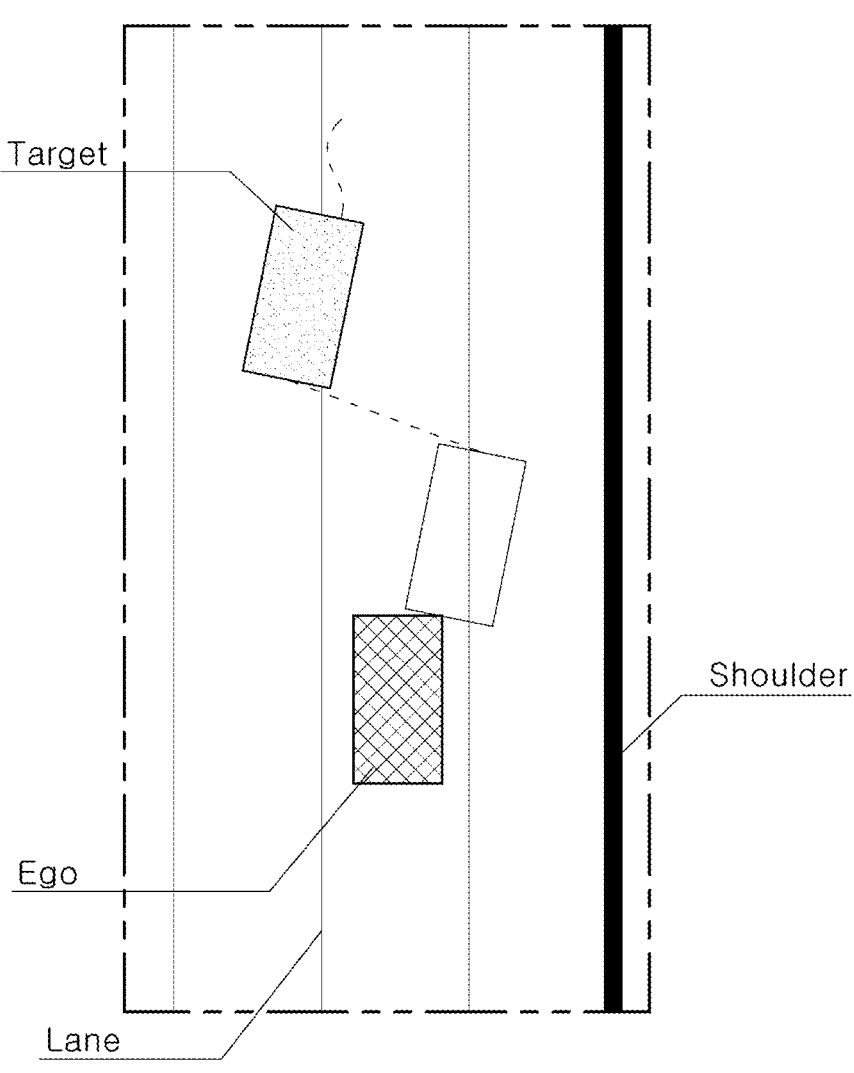
Figure 11:
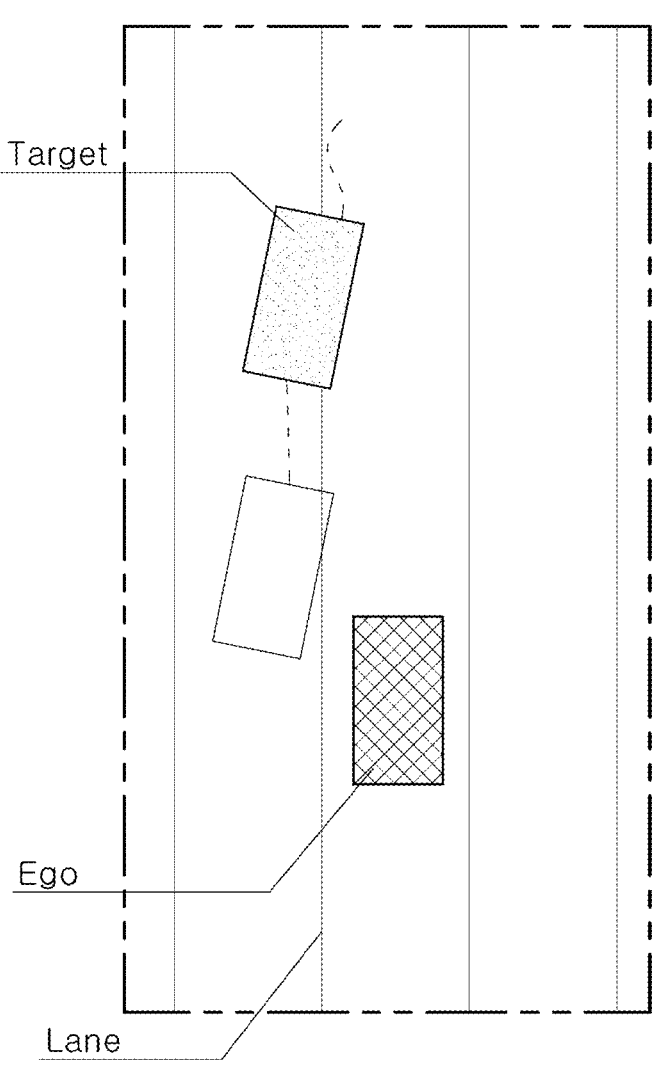
Figure 12:
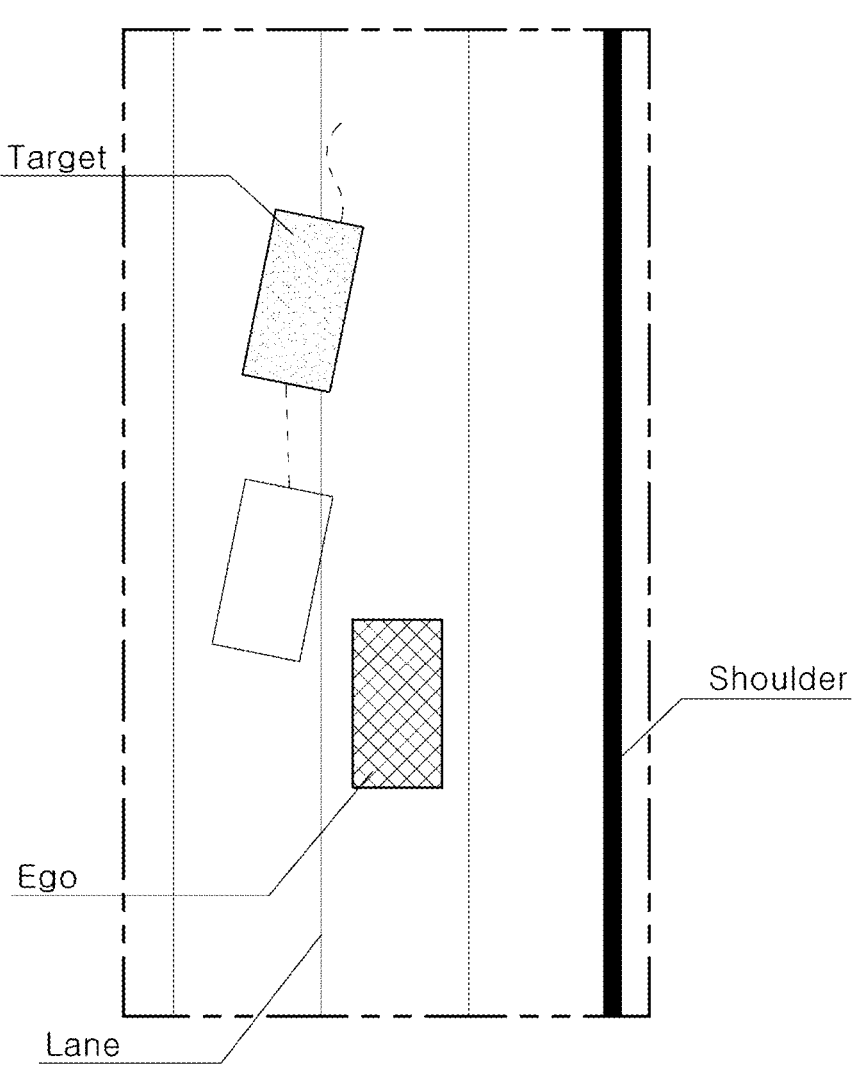
Figure 13:
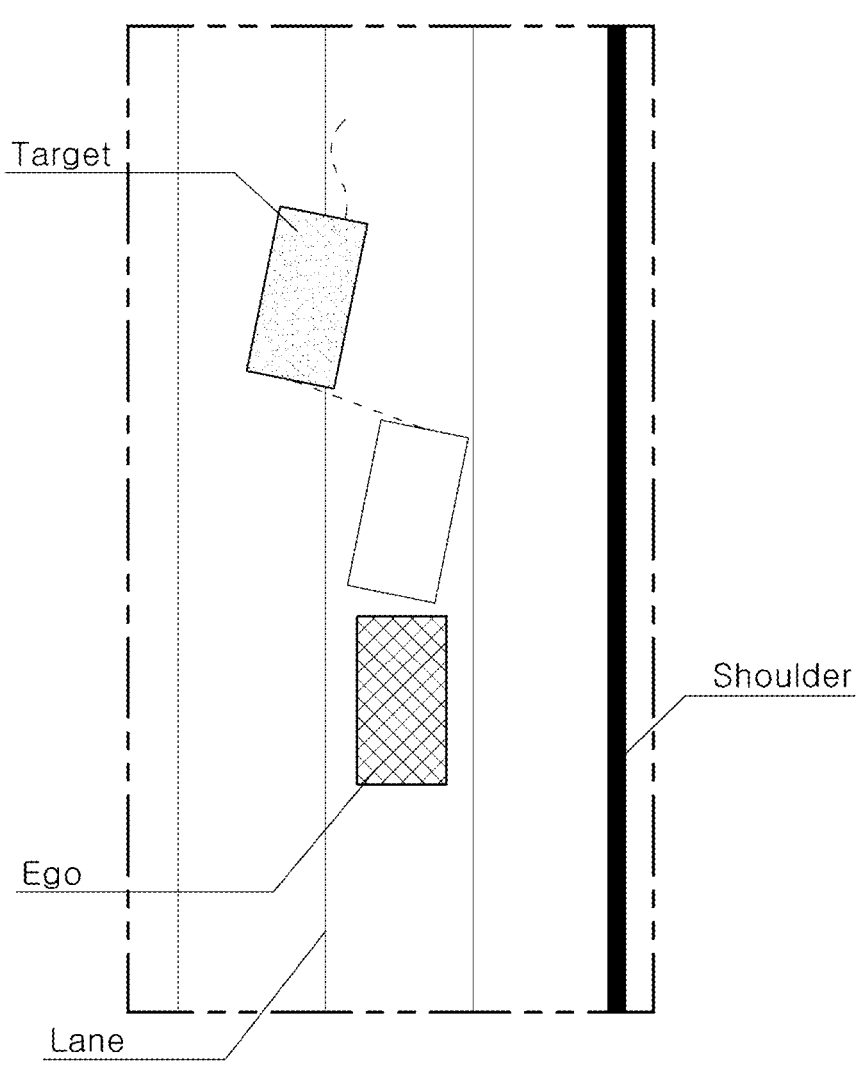
Figure 14:
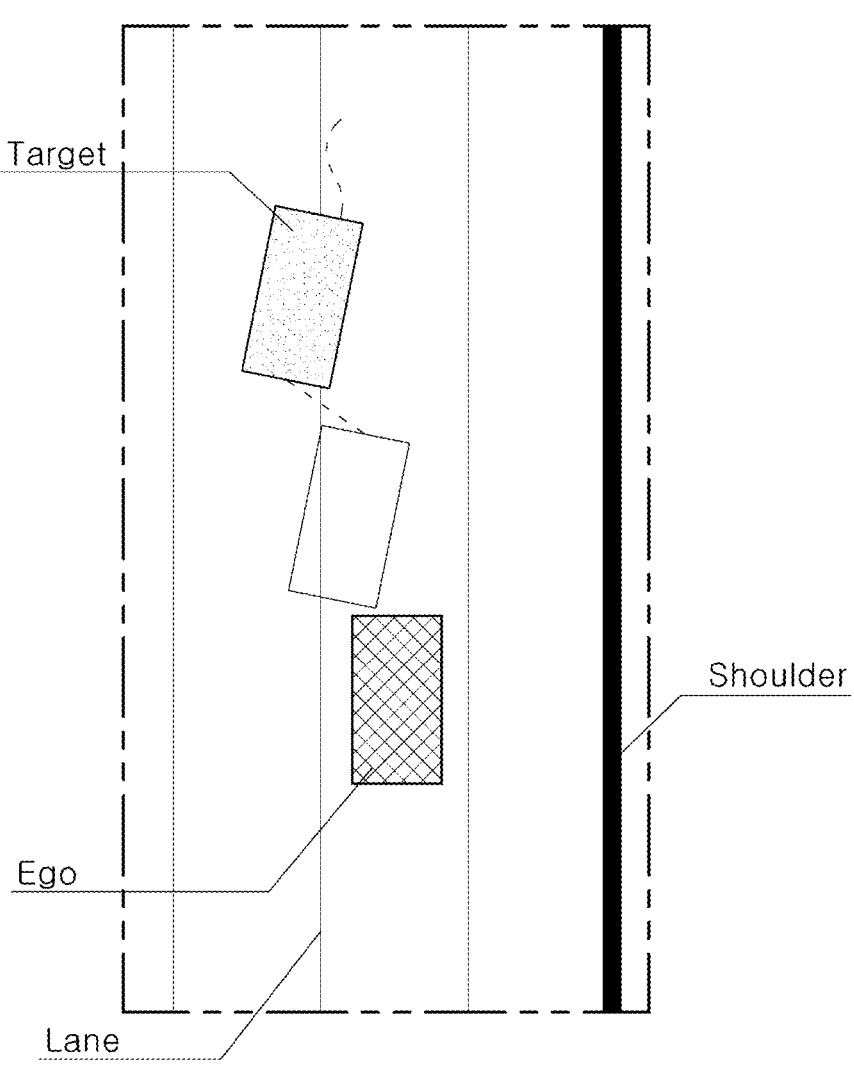
Figure 15:
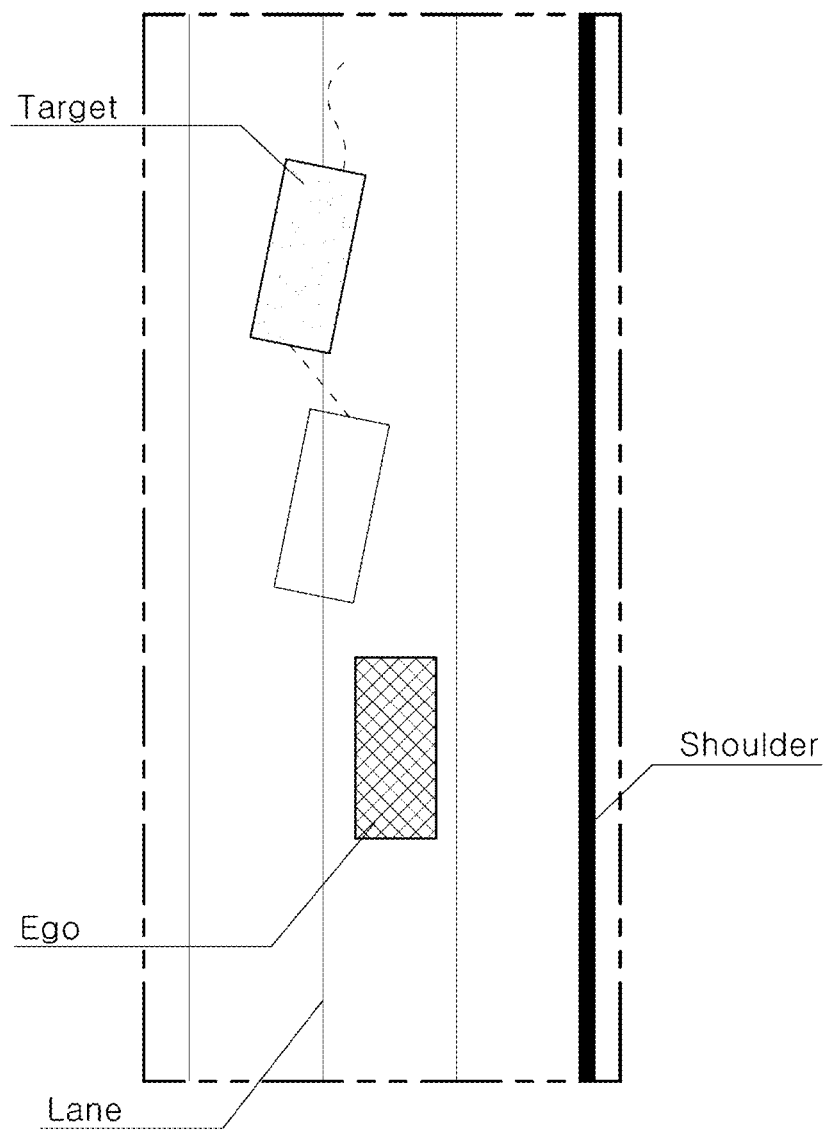
FIGS. 15-26 are bird's-eye views of the collision avoidance strategy determination unit according to the present disclosure when determining "safety" or "collision."
Figure 16:
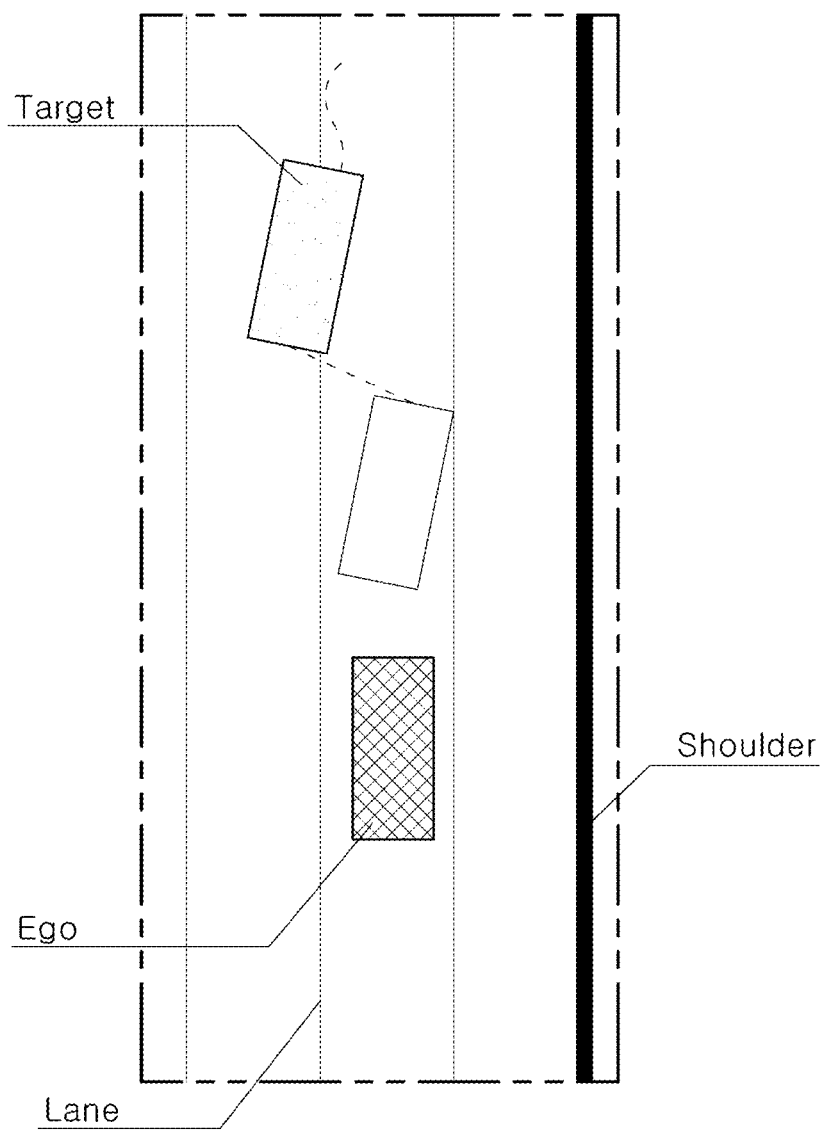
Figure 17:
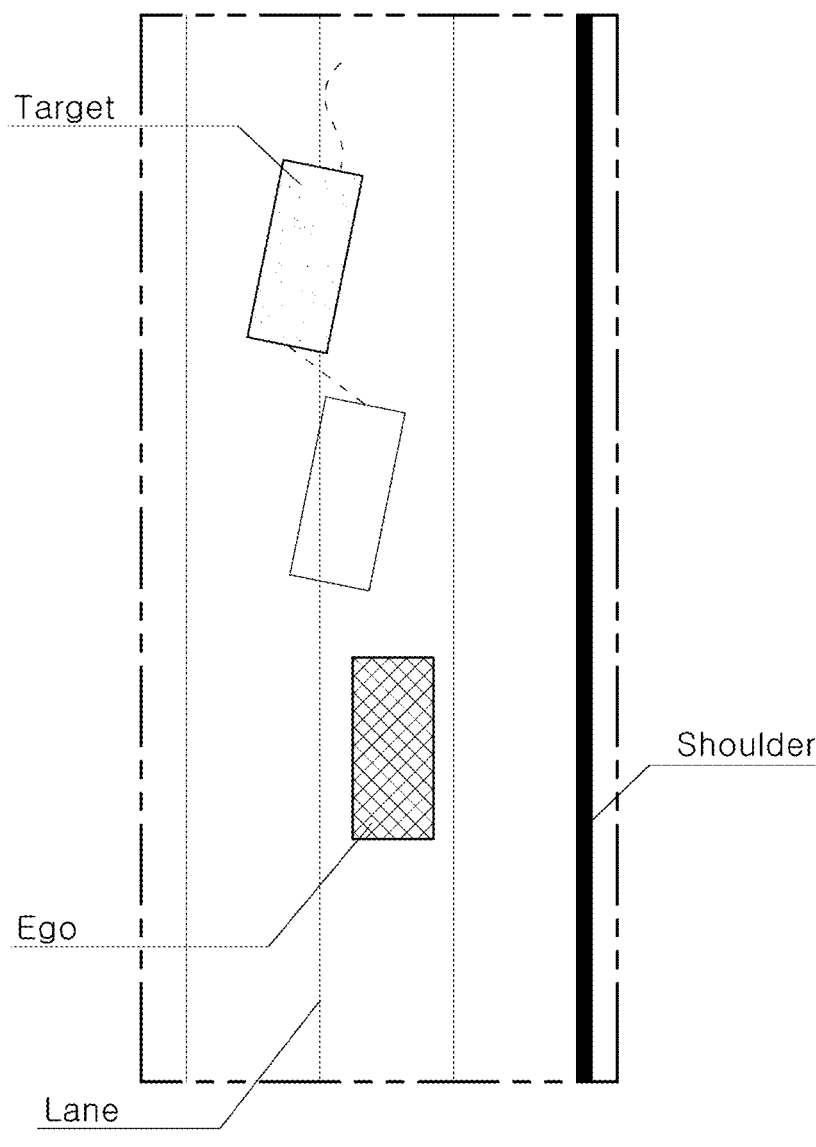
Figure 18:
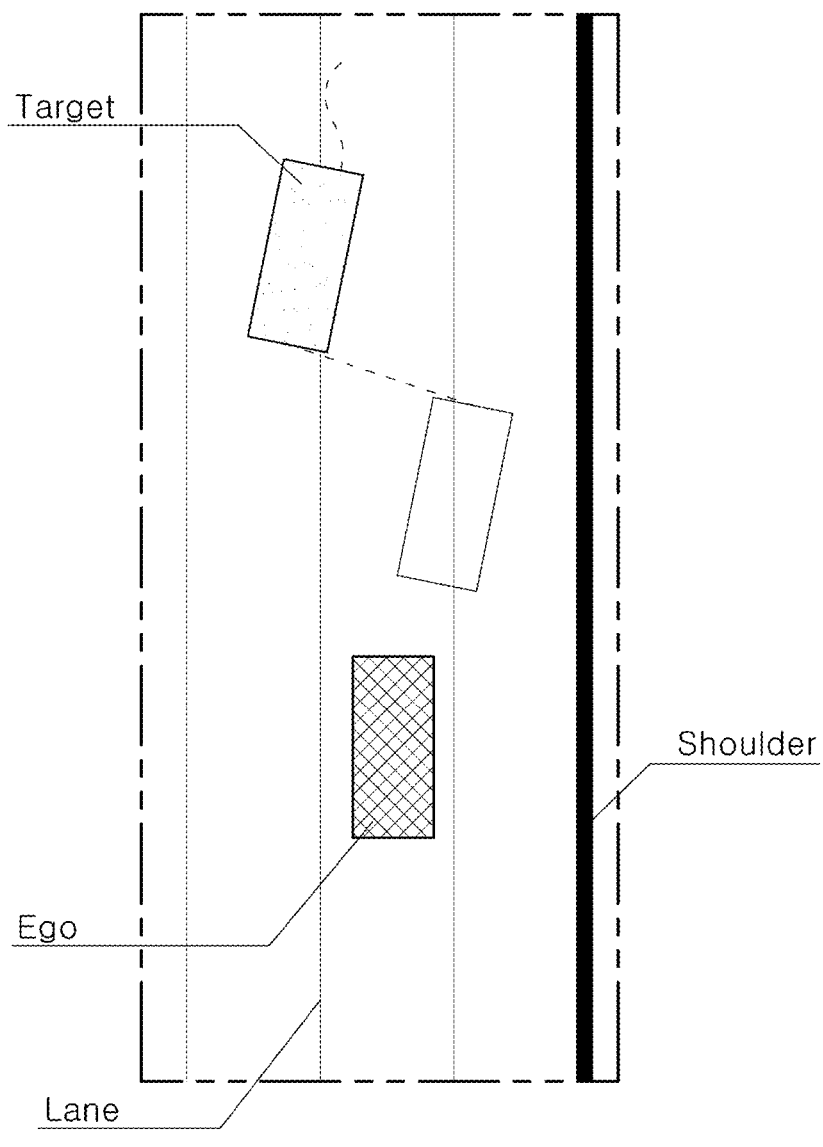
Figure 19:
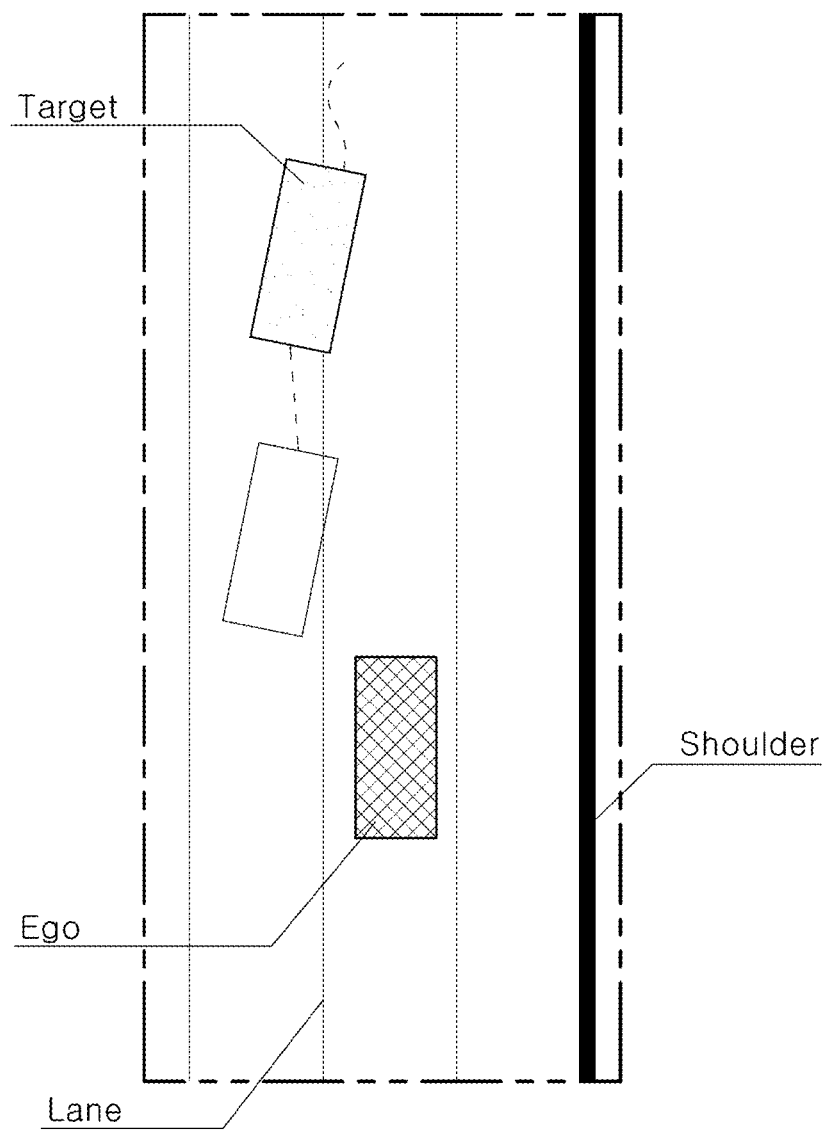
Figure 20:
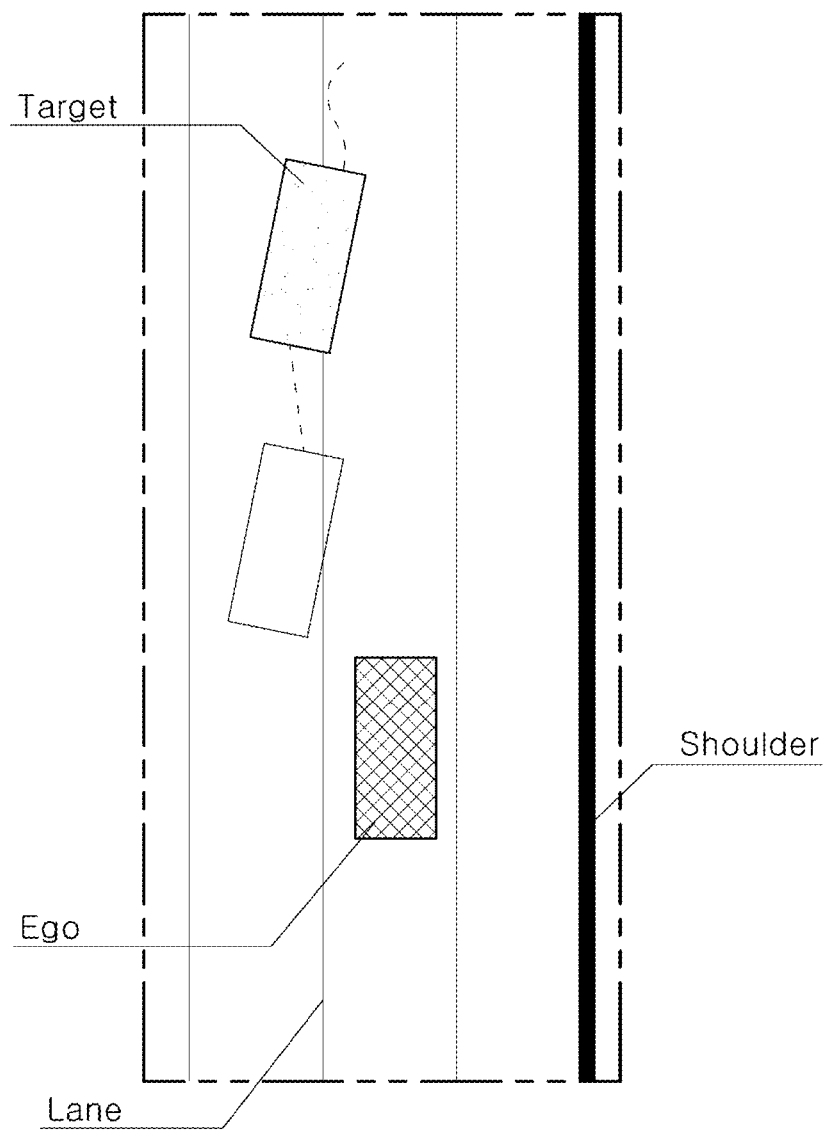
Figure 21:
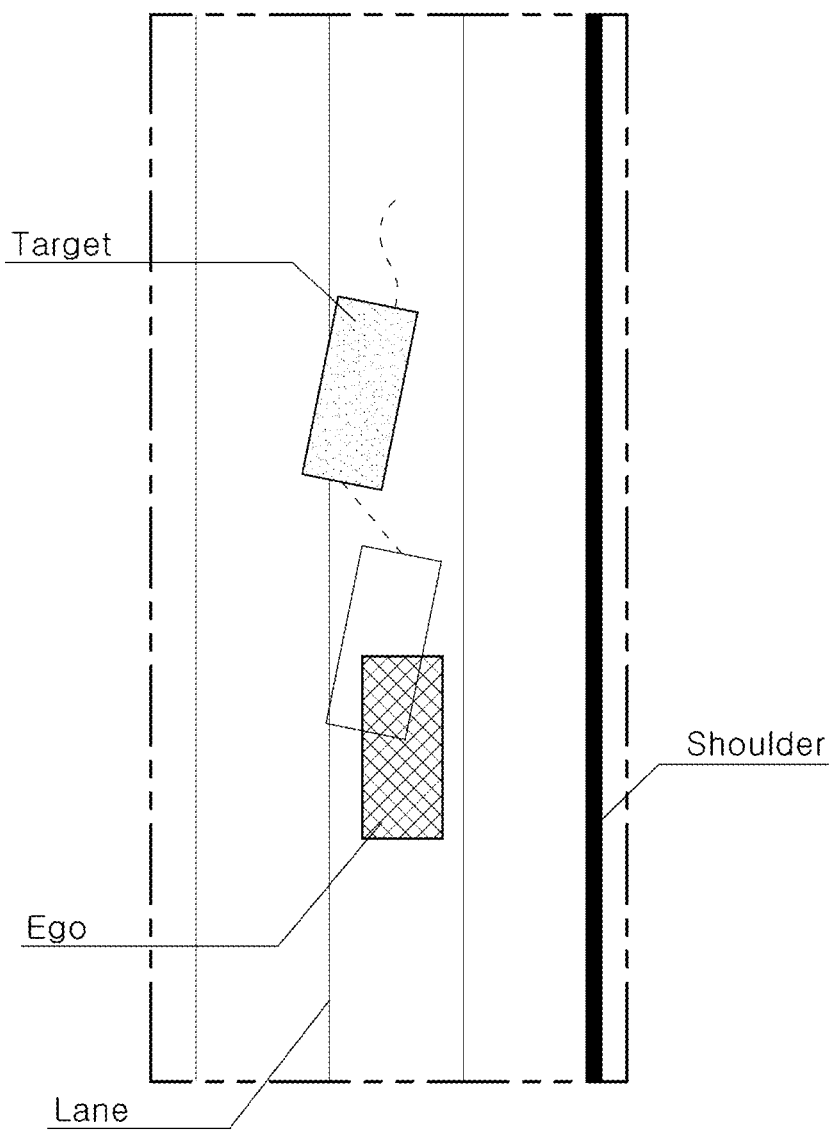
Figure 22:
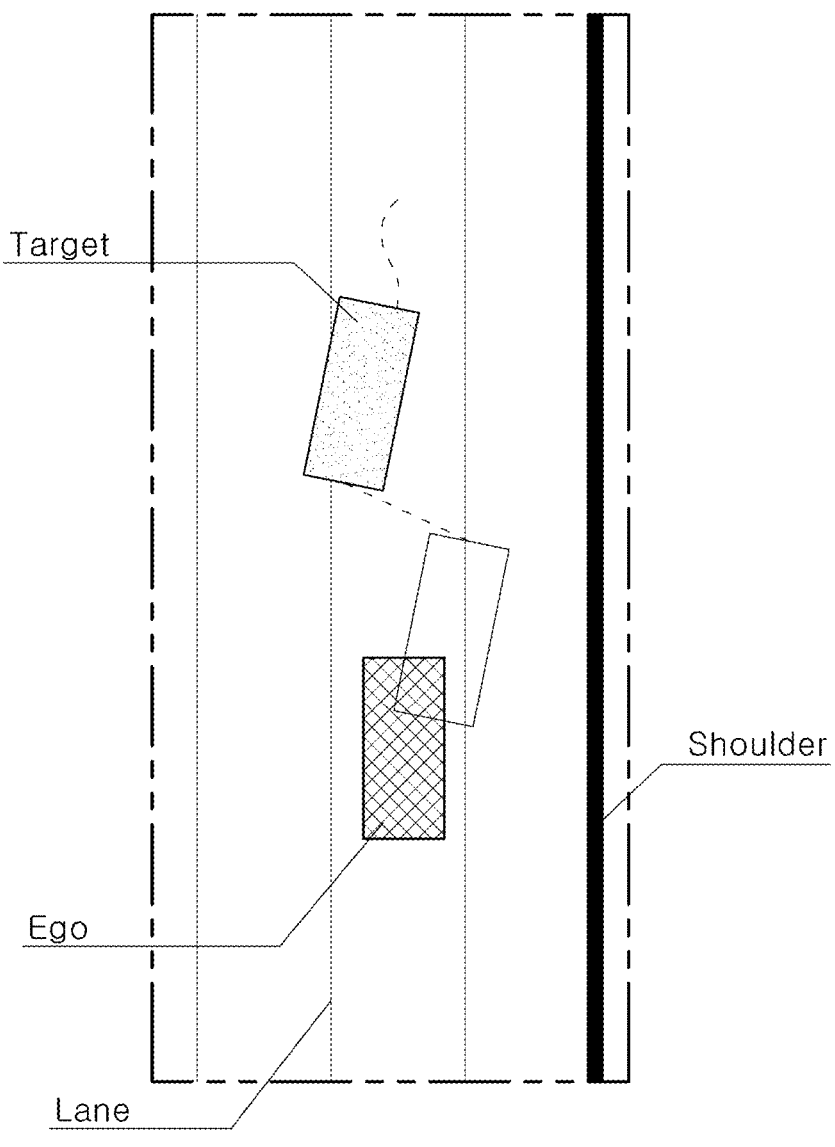
Figure 23:
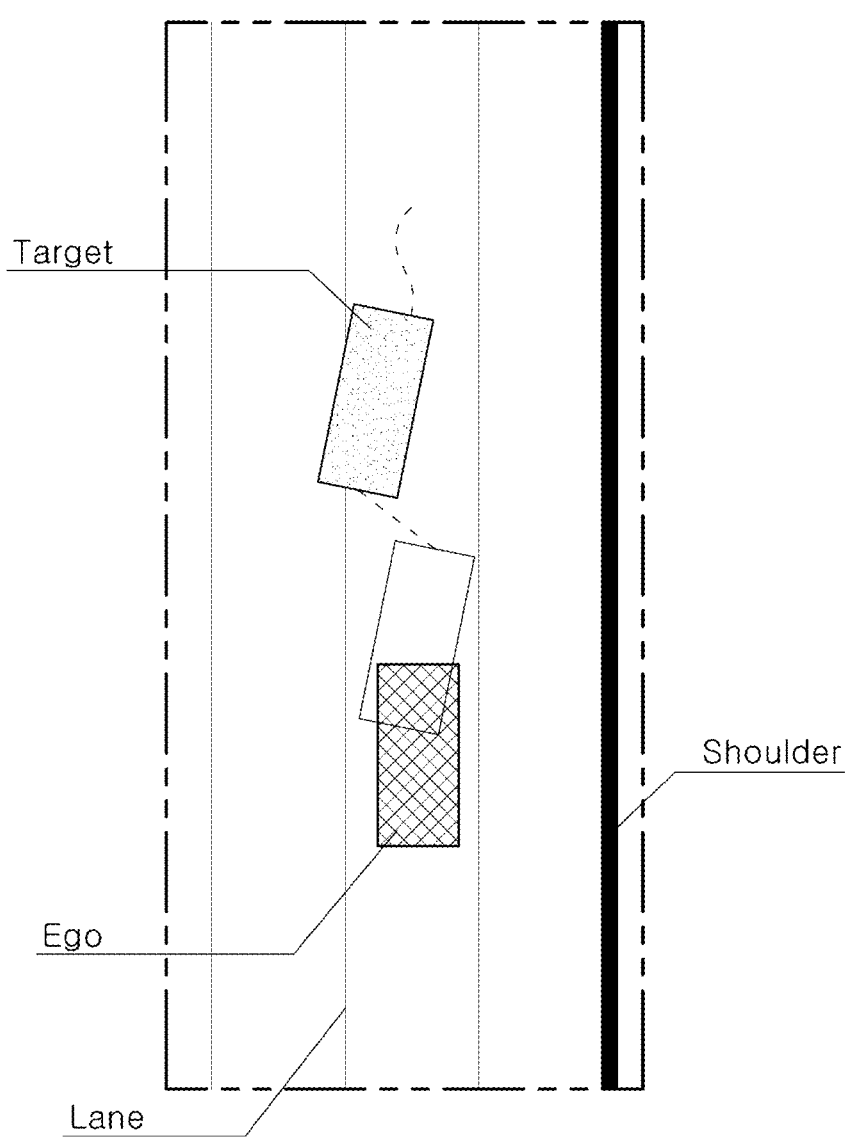
Figure 24:
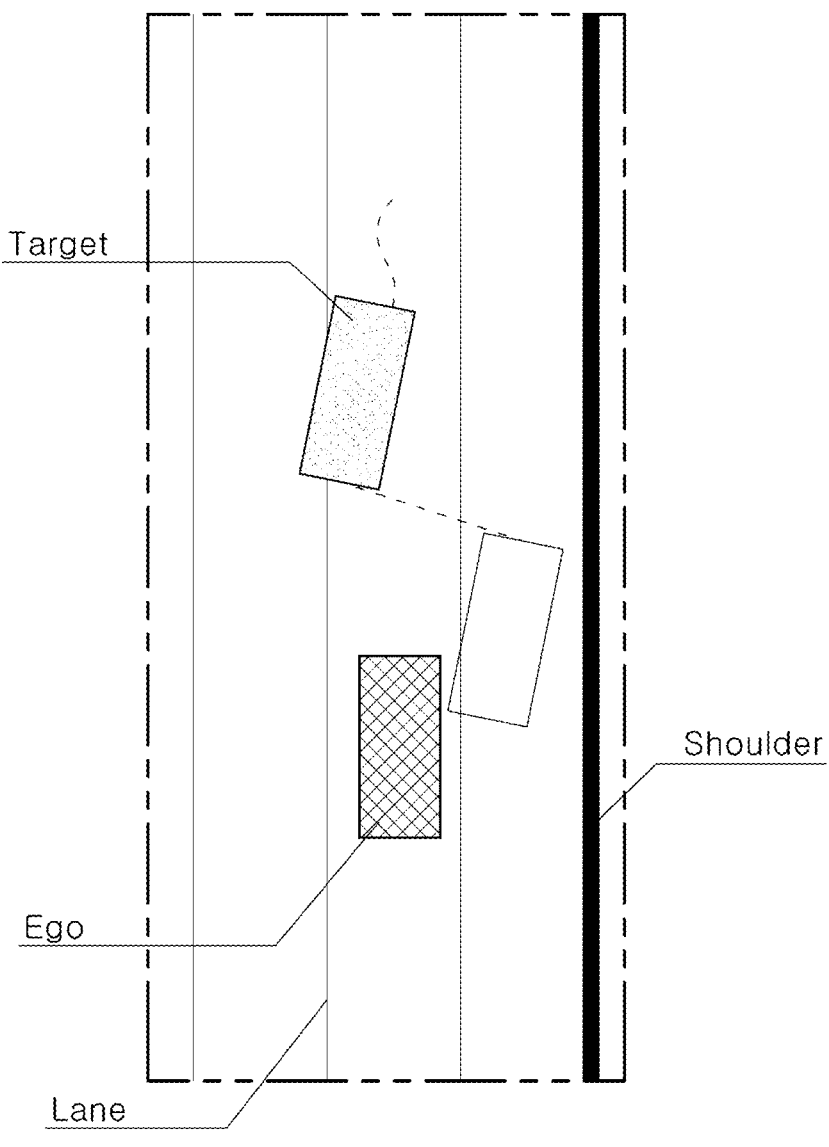
Figure 25:
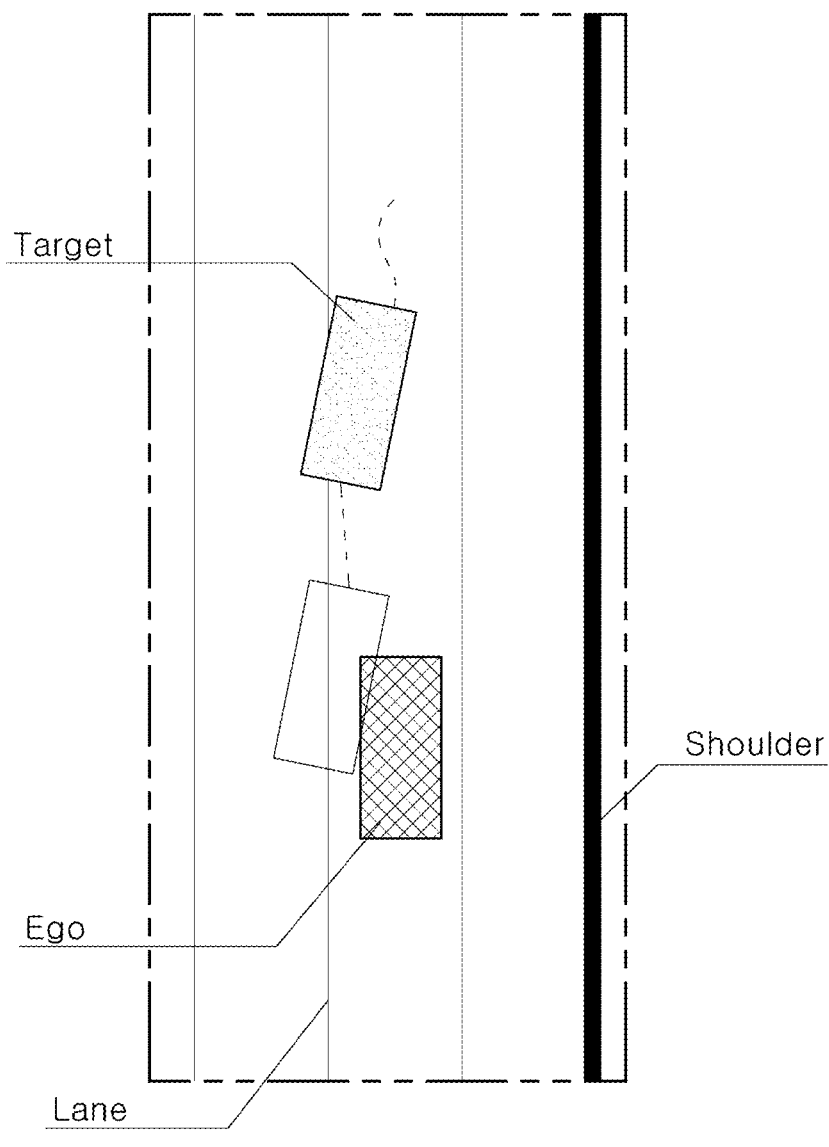
Figure 26:
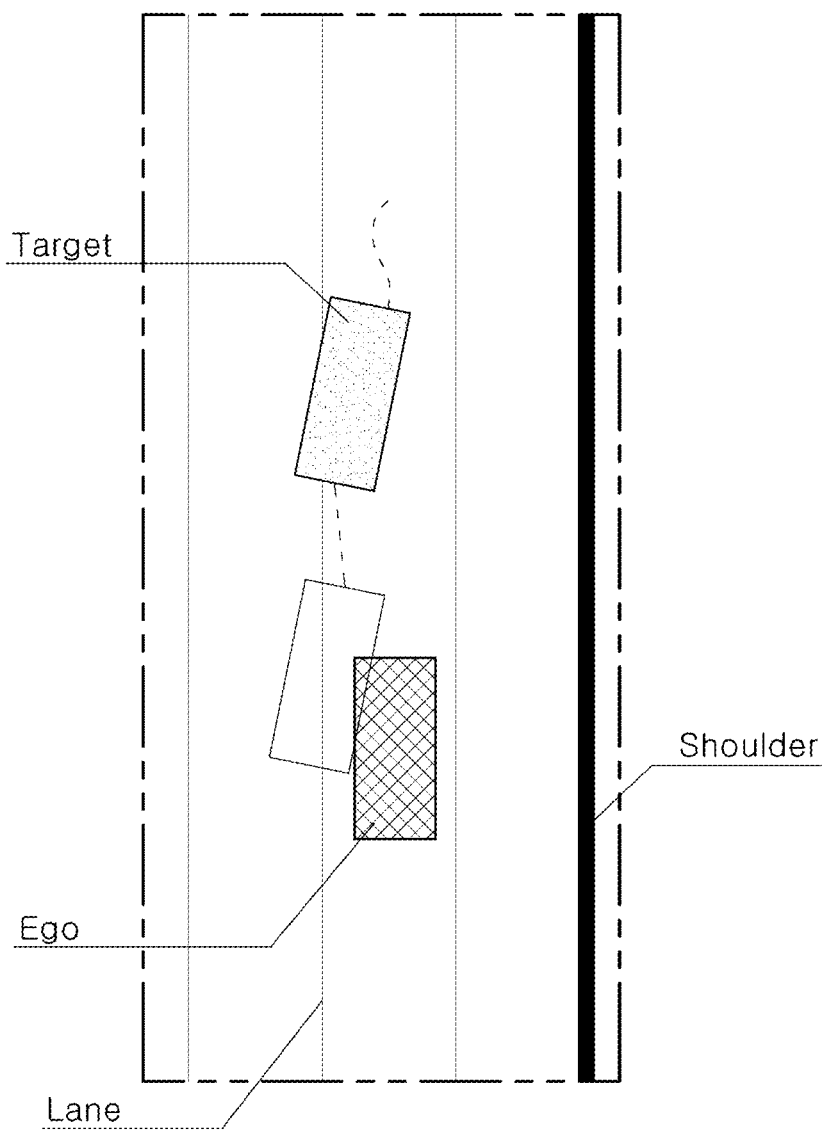

FIG. 9 shows a state in which the avoidance strategy is not applied (None), FIG. 10 shows a lane change to left (LCL), FIG. 11 shows a lane change to right (LCR), FIG. 12 shows SSS, FIG. 13 shows an evasive steering to left (ESL), and FIG. 14 shows an evasive steering to right (ESR).

Next, an expected avoidance trajectory may be generated according to the 5 avoidance strategies using the avoidance trajectory generation equation used in Equation 4. Thereafter, as shown in FIG. 8, the location of the nearby vehicle may be drawn based on the ego vehicle.

FIGS. 9-14 are examples in which all 5 avoidance strategies are reflected to the situation given in FIG. 5 and expressed as a bird's eye view of an avoidance trajectory. Since the given situation is a situation in which the vehicle travels on the last lane of the road, the situation is the same as LCR and SSS, and the bird's eye view of the avoidance trajectory also matches.

"None" shows a bird's eye view of a situation in which the avoidance strategy has not been performed and shows that a collision may occur even with the avoidance strategy in the lane. On the other hand, it can be schematically confirmed that the collision avoidance is possible with the shoulder avoidance or lane change strategy.

As in the example, when multiple collision avoidance strategies are possible, priority may be given. In other words, the collision avoidance strategy is selected in the order of SSS→ES→LC, and in the present example, the network is learned so that the SSS may be selected.

Next, FIGS. 15-26 are bird's eye views of the collision avoidance strategy determination unit according to the present disclosure when determining "safety" or "collision," in which FIGS. 15-20 show the bird's eye views of the safe situation, and FIGS. 21-26 show the bird's eye views of the collision situation.

FIGS. 15-20 are sequentially the bird's-eye views upon the None, LCL, LCR, SSS, ESL, and ESR strategies, and FIGS. 21-26 are sequentially bird's-eye views upon the None, LCL, LCR, SSS, ESL, and ESR strategies.

In the safe situation, it can be confirmed that the degree of hatching of the nearby vehicle (target) is sparser than that in the previous example, and when marked in RGB, the degree of hatching of the nearby vehicle (target) may be marked in red with low brightness.

The situation classified as "safety" in FIG. 10 is a situation in which it is predicted that no collision occurs in a situation in which the avoidance trajectory is not considered and shows a bird's eye view showing that it is predicted that no collision occurs with respect to all 5 avoidance strategies, such as the lane change (left/right), the steering to shoulder stop (SSS), and the evasive steering(ES) (left/right). The deep learning-based collision avoidance strategy determination unit learns to finally select "safety."

FIG. 10 shows a bird's eye view of the avoidance trajectory in which all 5 avoidance strategies are applied to a situation classified as "collision (COL)." This case is an example showing a situation in which avoidance is not possible with the given avoidance strategy. In this case, the deep learning-based collision avoidance strategy determination unit learns to finally select "collision."

Therefore, the deep learning-based collision avoidance strategy determination unit serves to select one of a total of 7 strategies (including 5 safety, collision, and avoidance strategies). In addition, learning is performed after desirably performing 7 types of annotations on traveling data and simulation data.

Figure 27:
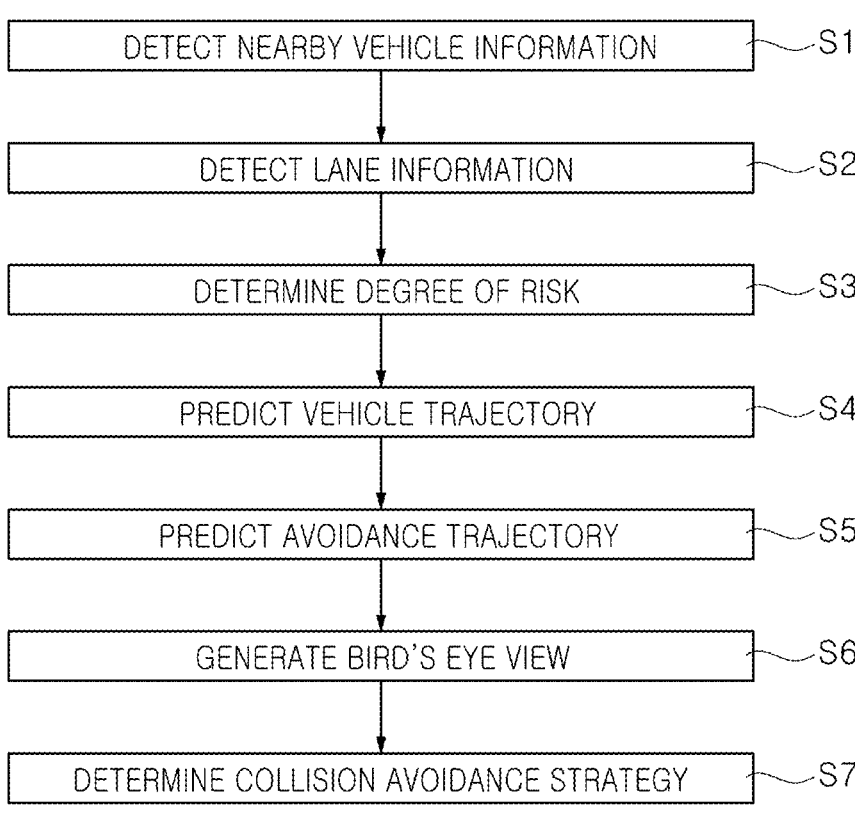
FIG. 27 is a flowchart of a method of establishing an emergency collision avoidance strategy according to the present disclosure.
Figure 28:
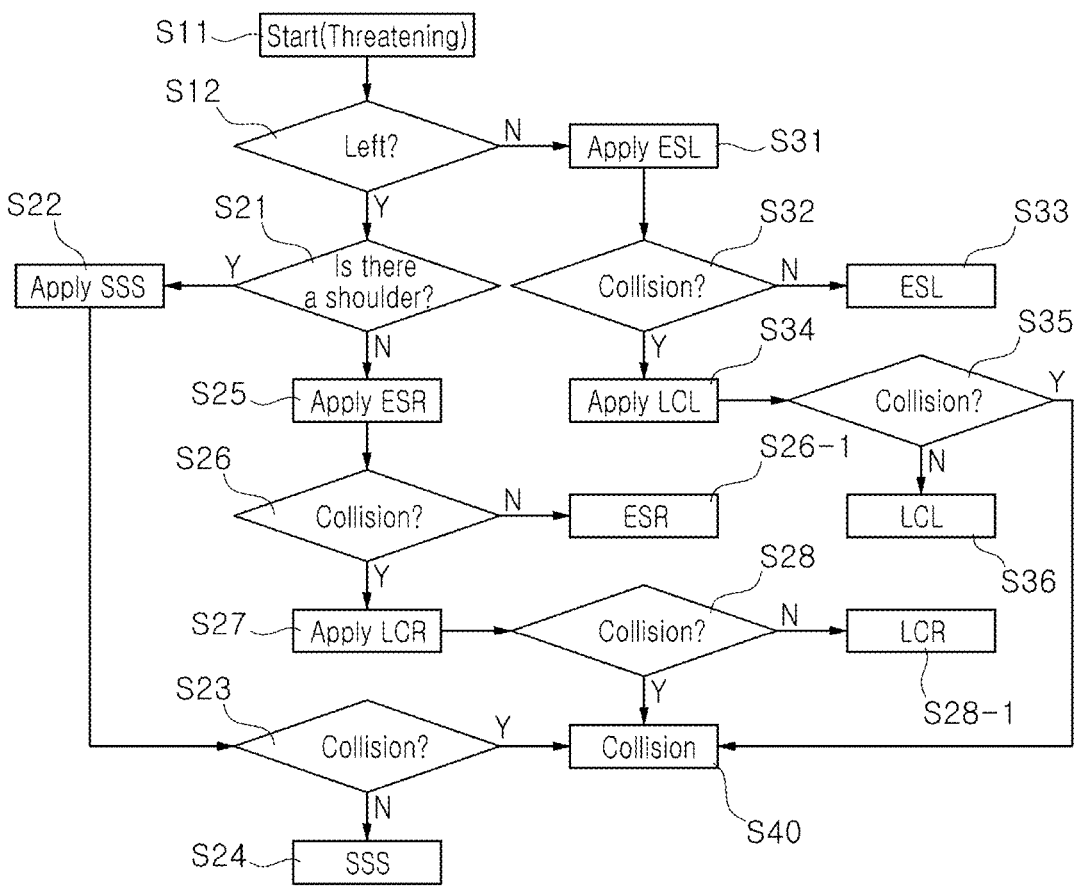
FIG. 28 is a detailed flowchart of determining the collision avoidance strategy in FIG. 27.

Next, FIG. 27 is a flowchart of the method of establishing an emergency collision avoidance strategy according to the present disclosure, and FIG. 28 is a detailed flowchart of determining the collision avoidance strategy in FIG. 27.

Hereinafter, the method of establishing the emergency collision avoidance strategy of the vehicle according to one embodiment of the present disclosure is described with reference to FIGS. 27 and 28.

The method of generating the emergency collision avoidance strategy of the vehicle according to the present disclosure includes detecting nearby vehicle information by the nearby vehicle information detection unit (S1), detecting lane information by the lane information detection unit (S2), determining the degree of risk using the same (S3), and predicting the vehicle trajectory (S4).

The method includes determining whether the emergency collision avoidance strategy is required (S7) by determining the degree of risk (S3) and by generating a bird's eye view corresponding to each avoidance strategy (S6) based on the predicted trajectory of the nearby vehicle calculated by predicting the vehicle trajectory (S4) and based on the predicted trajectory of the ego vehicle calculated by predicting the avoidance trajectory (S5).

Figure 29:
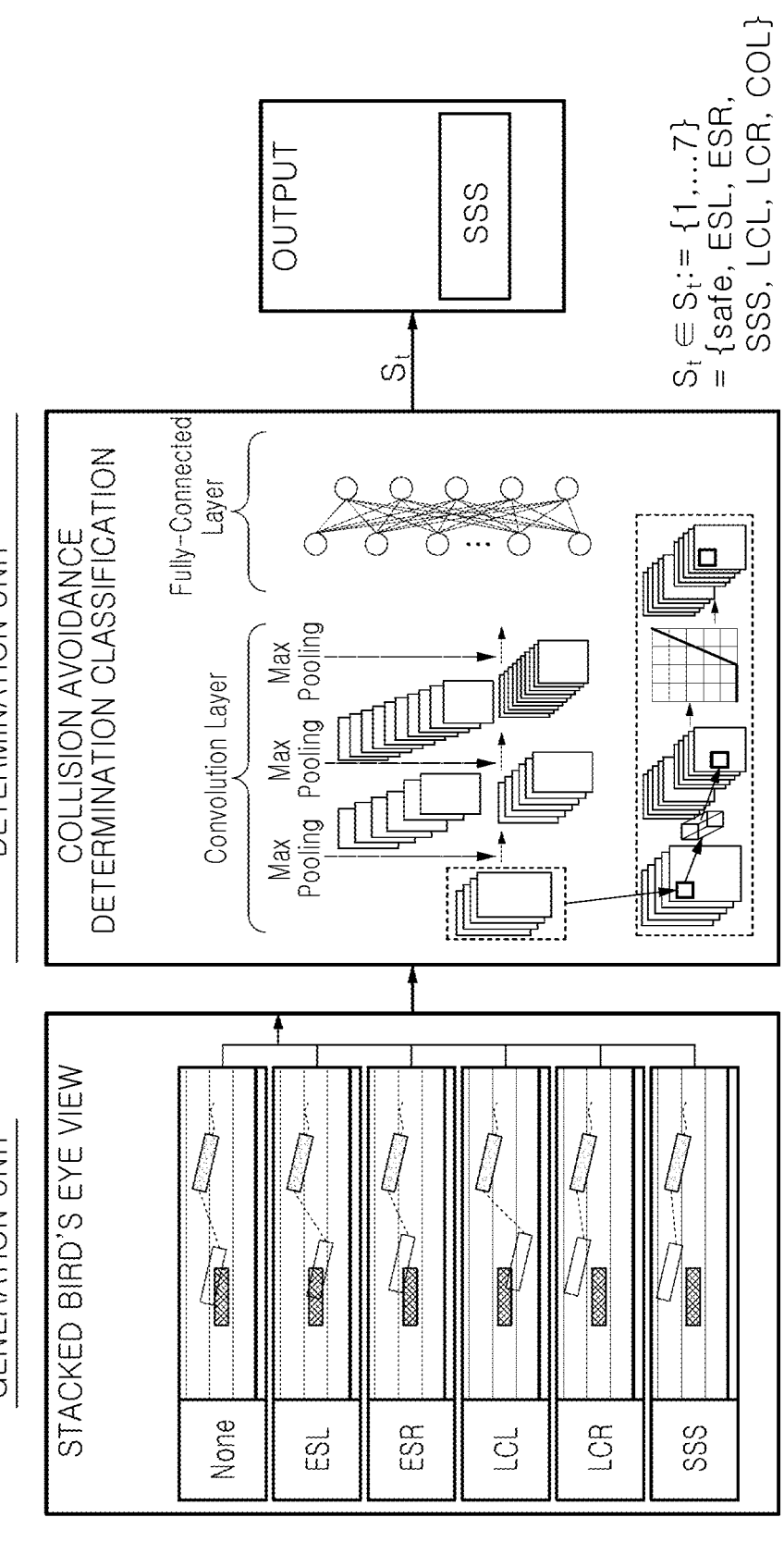
FIG. 29 shows a process of determining the collision avoidance strategy by a collision avoidance strategy determination unit according to the present disclosure.

Like the network in FIG. 29, the collision avoidance strategy is classified based on the CNN among the deep-learning techniques using the stacked bird's eye view as an input. As shown, the SSS may be output with the optimal avoidance strategy. In addition to the avoidance strategy, it is determined to be "safety" in the non-risky situation and determined to be "collision" in the situation in which avoidance is not possible, and one of 7 avoidance strategies is output finally.

The avoidance strategy determination sequence is more specifically described with reference to FIG. 28. The avoidance strategy determination is initiated by determining degree of risk (S11), and a direction to be avoided is first determined in consideration of a relative location of a risky vehicle.

In other words, it is determined whether another vehicle is present at the left of the ego vehicle (S12), and if so (Y in S12), it is determined whether the next shoulder is present (S21).

When the shoulder is present (Y in S21), the SSS strategy is performed (S22) and whether a collision will occur (i.e., a collision may be avoided) is checked (S23). When a collision will not occur (N in S23) (i.e., the collision avoidance is possible), the SSS is derived as the result value (S24). When a collision will occur (Y in S24) (i.e., the collision avoidance is not possible), "collision" is derived as the result (S40).

When there is no shoulder (No in S21), the strategy is performed in the above-described order, i.e., in the order of ESR and LCR, and whether avoidance is possible is determined with the performed strategy.

In other words, the ESR strategy is performed (S25), and whether a collision will occur (i.e., the collision may be avoided) is checked (S26). When a collision will not occur (N in S26) (i.e., the collision avoidance is possible), the ESR is derived as the result value (S26-1). When a collision will occur (Y in S26) (i.e., the collision avoidance is not possible, the LCR strategy is performed (S27) to check whether a collision will occur (i.e., the collision may be avoided) (S28). Thus, when a collision will not occur (N in S28) (i.e., the collision avoidance is possible), the LCR is derived as the result value (S28-1). When a collision will occur (Y in S28) (i.e., the collision avoidance is not possible), "collision" is derived as the result (S40).

When the nearby vehicle is not present at the left (N in S12), the ESL strategy is performed (S31), and whether a collision will occur (i.e., the collision may be avoided) is checked (S32).

When a collision will not occur (N in S32) (i.e., the collision avoidance is possible), the ESL is derived as the result value (S33). When a collision will occur (Y in S32) (i.e., the collision avoidance is not possible), the LCL strategy is performed (S34) to check whether a collision will occur (i.e., the collision avoidance is possible) (S35).

As a result of checking, when a collision will not occur (N in S35) (i.e., the collision avoidance is possible), the LCL is derived as the result value (S36). When a collision will occur (Y in S36) (i.e., the collision avoidance is not possible), "collision" is derived as the result (S40).

As described above, it is possible to determine the time point at which the control authority is transferred from the autonomous driving system to the integrated safety system in the risky situations in which the collision is expected, establish a more sophisticated collision avoidance strategy before an actual collision time point, and minimize the degree of risk even when the collision occurs through the cooperative control with the collision avoidance system.

Although the present disclosure has been described above with reference to the drawings, the present disclosure is not limited to the described embodiments, and it is apparent to those having ordinary skill in the art that various modifications and changes can be made without departing from the spirit and scope of the present disclosure. Therefore, these modified examples or changed examples should be included in the claims of the present disclosure, and the scope of the present disclosure should be construed based on the appended claims.

What is claimed is:

1. A system for establishing a strategy for allowing a vehicle to avoid collision risk, the system being implemented by a processor, the system comprising:
a risk degree determination unit configured to determine a degree of collision risk with a surrounding object of an ego vehicle;
a vehicle trajectory analysis unit configured to analyze a future vehicle trajectory of the surrounding object;
an avoidance trajectory analysis unit configured to analyze a future avoidance trajectory of the ego vehicle corresponding to a plurality of avoidance strategies for avoiding collision with the surrounding object; and
a collision avoidance strategy determination unit configured to learn the future vehicle trajectory of the surrounding object and the future avoidance trajectory of the ego vehicle and output an avoidance strategy selected from the plurality of avoidance strategies,
wherein the collision avoidance strategy determination unit is configured to output the avoidance strategy with a set high priority when it is determined that multiple avoidance strategies among the plurality of avoidance strategies are possible as a result of learning.

2. The system of claim 1, further comprising:
a bird's eye view generation unit configured to generate a bird's eye view image reflecting the degree of collision risk, a result of analyzing the future vehicle trajectory of the surrounding object, and a result of analyzing the future avoidance trajectory of the ego vehicle.

3. The system of claim 2, wherein the collision avoidance strategy determination unit is configured to:
learn a stacked bird's eye view of a plurality of bird's eye view images reflecting a plurality of avoidance trajectory analysis results; and
output the avoidance strategy selected from the avoidance strategies through a convolutional neural network (CNN) technique.

4. The system of claim 3, further comprising:
a surrounding object information detection unit configured to acquire state information including a location, a speed, and an acceleration of the surrounding object through a sensor mounted on the vehicle; and
a lane information detection unit configured to acquire lanes within a predetermined distance from the ego vehicle and shoulder information through the sensor mounted on the vehicle or a precision map.

5. The system of claim 4, wherein the risk degree determination unit is configured to:
calculate a longitudinal collision risk index, a time to lane crossing (TLC), and a lateral collision risk index using the state information and lane and shoulder information; and
determine the degree of collision risk.

6. The system of claim 4, wherein the vehicle trajectory analysis unit is configured to analyze the future vehicle trajectory of the surrounding object through an estimation algorithm or a deep-learning algorithm using the state information and the lane and shoulder information.

7. The system of claim 4, wherein the bird's eye view generation unit configured to generate the bird's eye view image reflecting a past traveling trajectory, a current location, a future vehicle trajectory, and a final location of the surrounding object, a current location and an avoidance trajectory prediction result of the ego vehicle, and lane and shoulder information within a predetermined distance from the ego vehicle.

8. The system of claim 7, wherein the bird's eye view generation unit is configured to generate the bird's eye view image to be displayed separately according to the degree of collision risk.

9. The system of claim 4, wherein the plurality of avoidance strategies includes a lane change to left (LCL), a lane change to right (LCR), a steering to shoulder stop (SSS), an evasive steering to left (ESL), and an evasive steering to right (ESR).

10. The system of claim 4, wherein the collision avoidance strategy determination unit is configured to output a result value corresponding to safety when it is analyzed that no collision with the surrounding object occurs as a result of learning without considering the future avoidance trajectory of the ego vehicle.

11. The system of claim 4, wherein the collision avoidance strategy determination unit is configured to output a result value corresponding to collision when it is analyzed that it is impossible to avoid collision with the surrounding object as a result of learning the plurality of avoidance strategies.

12. A method of establishing a strategy for allowing a vehicle to avoid collision risk, the method comprising:

acquiring state information including a location, a speed, and an acceleration of a surrounding object and lane and shoulder information within a predetermined distance from an ego vehicle;

determining a degree of collision risk with the surrounding object of the ego vehicle by using the state information and the lane and shoulder information;

analyzing a future vehicle trajectory of the surrounding object by using the state information and the lane and shoulder information;

analyzing a future avoidance trajectory of the ego vehicle corresponding to a plurality of avoidance strategies for avoiding collision with the surrounding object;

learning the future vehicle trajectory of the surrounding object and the future avoidance trajectory of the ego vehicle; and outputting an avoidance strategy selected from the plurality of avoidance strategies, wherein outputting the avoidance strategy is configured to output the avoidance strategy with a set high priority when it is determined that multiple avoidance strategies among the plurality of avoidance strategies are possible as a result of learning.

13. The method of claim 12, further comprising:

generating a bird's eye view image reflecting results of determining the degree of collision risk, analyzing the future vehicle trajectory of the surrounding object, and analyzing the future avoidance trajectory of the ego vehicle, wherein outputting the avoidance strategy includes:

learning a stacked bird's eye view of a plurality of bird's eye view images reflecting a plurality of avoidance trajectory analysis results, and outputting the avoidance strategy selected from the avoidance strategies through a convolutional neural network (CNN) technique.

14. The method of claim 13, wherein generating the bird's eye view image includes generating the bird's eye view image reflecting a past traveling trajectory, a current location, a future vehicle trajectory, and a final location of the surrounding object, a current location and an avoidance trajectory analysis result of the ego vehicle, and the lane and shoulder information within a predetermined distance from the ego vehicle; and separately displaying the bird's eye view image according to the degree of collision risk.

15. The method of claim 13, wherein the plurality of avoidance strategies includes a lane change to left (LCL), a lane change to right (LCR), a steering to shoulder stop (SSS), an evasive steering to left (ESL), and an evasive steering to right (ESR).

16. The method of claim 15, wherein outputting the avoidance strategy includes:

determining whether the surrounding object is present at a left side of the ego vehicle;

determining whether a shoulder is present within a predetermined distance from the ego vehicle when the surrounding object is present at the left side of the ego vehicle;

determining whether collision occurs when an SSS strategy is applied when the shoulder is present;

outputting the SSS strategy when the collision does not occur when the SSS strategy is applied; and outputting a result value corresponding to the collision when the collision occurs.

17. The method of claim 16, further comprising:

determining whether the collision occurs when an ESR strategy is applied when no shoulder is present by determining whether the shoulder is present;

outputting the ESR strategy when no collision occurs when the ESR strategy is applied;

determining whether the collision occurs when an LCR strategy is applied when the collision occurs when the ESR strategy is applied;

outputting the LCR strategy when no collision occurs when the LCR strategy is applied; and outputting a result value corresponding to the collision when the collision occurs.

18. The method of claim 16, further comprising:

determining whether the collision occurs when an ESL strategy is applied when no surrounding object is present at the left side of the ego vehicle by the determining of whether the surrounding object is present at the left side of the ego vehicle;

outputting the ESL strategy when no collision occurs when the ESL strategy is applied;

determining whether the collision occurs when an LCL strategy is applied when the collision occurs when the ESL strategy is applied;

outputting the LCL strategy when no collision occurs when the LCL strategy is applied; and outputting a result value corresponding to the collision when the collision occurs.

19. The method of claim 15, wherein outputting the avoidance strategy includes outputting a result value corresponding to safety when it is analyzed that no collision with the surrounding object occurs as a result of learning without considering the future avoidance trajectory of the ego vehicle.

* * * * *